(12) United States Patent
Akanuma et al.

(10) Patent No.: US 10,487,879 B2
(45) Date of Patent: Nov. 26, 2019

(54) BALL BEARING ASSEMBLY METHOD AND ASSEMBLY DEVICE, AND BALL BEARING PRODUCED USING SAID ASSEMBLY METHOD

(71) Applicant: NSK LTD., Tokyo (JP)

(72) Inventors: Norihito Akanuma, Konan (JP); Hiroshi Araki, Fujisawa (JP)

(73) Assignee: NSK LTD., Tokyo (JP)

( * ) Notice: Subject to any disclaimer, the term of this patent is extended or adjusted under 35 U.S.C. 154(b) by 115 days.

(21) Appl. No.: 15/510,362

(22) PCT Filed: Sep. 11, 2015

(86) PCT No.: PCT/JP2015/075782
§ 371 (c)(1),
(2) Date: Jul. 7, 2017

(87) PCT Pub. No.: WO2016/039434
PCT Pub. Date: Mar. 17, 2016

(65) Prior Publication Data
US 2017/0363148 A1    Dec. 21, 2017

(30) Foreign Application Priority Data
Sep. 12, 2014    (JP) ................................ 2014-186279

(51) Int. Cl.
*F16C 43/06*    (2006.01)
*F16C 19/02*    (2006.01)
(Continued)

(52) U.S. Cl.
CPC ............ *F16C 43/065* (2013.01); *B23P 21/00* (2013.01); *B25J 13/00* (2013.01); *F16C 19/02* (2013.01);
(Continued)

(58) Field of Classification Search
CPC ........ F16C 43/065; F16C 19/02; F16C 33/38; F16C 33/32; F16C 43/06; F16C 19/08;
(Continued)

(56) References Cited

U.S. PATENT DOCUMENTS 825,418 A * 7/1906 Rivett ..................... F16C 43/06
384/508
1,035,463 A * 8/1912 Oldfield .................. F16C 43/06
384/508
(Continued)

FOREIGN PATENT DOCUMENTS

CN        201013771 Y      1/2008
CN        201786945 U      4/2011
(Continued)

OTHER PUBLICATIONS

JPH 03213229 Machine translation, Sep. 18, 1991 Pub date.*
(Continued)

*Primary Examiner* — Ryan J. Walters
*Assistant Examiner* — Lawrence Averick
(74) *Attorney, Agent, or Firm* — Sughrue Mion, PLLC

(57) ABSTRACT

A ball bearing assembly device includes: an inner and outer ring holding unit which holds an outer ring and inner ring in a state where an outer ring raceway surface and inner ring raceway surface are eccentric to each other on a same plane so as to form a gap space; a stocker; a robot arm; a ball holding mechanism which is disposed at a tip of the robot arm; and a control unit. The control unit controls the ball holding mechanism to hold any ball from the stocker, controls the robot art to transport the held ball to a ball insertion position in the gap space corresponding to a kind of ball bearing, and inserts the held ball into the gap space, which are repeated by the number of balls of the ball bearing.

6 Claims, 23 Drawing Sheets

(51) Int. Cl.
  *B23P 21/00* (2006.01)
  *B25J 13/00* (2006.01)
  *F16C 19/06* (2006.01)
  *F16C 33/32* (2006.01)
  *F16C 33/38* (2006.01)

(52) U.S. Cl.
  CPC .............. *F16C 19/06* (2013.01); *F16C 33/32* (2013.01); *F16C 33/38* (2013.01); *F16C 43/06* (2013.01)

(58) Field of Classification Search
  CPC ......... F16C 43/04; F16C 19/06; B25J 9/1697; B25J 9/1687; B23P 21/00; Y10T 29/49634; Y10T 29/49643; Y10T 29/49647; Y10T 29/4968; Y10T 29/49682
  See application file for complete search history.

(56) References Cited

U.S. PATENT DOCUMENTS

| | | | | |
|---|---|---|---|---|
| 4,815,190 | A * | 3/1989 | Haba, Jr. | B23P 21/004 198/346.1 |
| 6,816,320 | B2 * | 11/2004 | Wada | G02B 15/177 359/676 |
| 7,406,768 | B2 * | 8/2008 | Ikeda | F16C 41/001 192/110 B |
| 2004/0012860 | A1 * | 1/2004 | Wada | G02B 13/22 359/680 |
| 2010/0063629 | A1 * | 3/2010 | Battisti | B25J 9/1679 700/259 |
| 2010/0154580 | A1 * | 6/2010 | Kent | B25J 9/107 74/490.05 |
| 2015/0343631 | A1 * | 12/2015 | Martinez-Esponda | B25J 9/0051 74/490.03 |
| 2017/0363148 | A1 * | 12/2017 | Akanuma | F16C 43/065 |

FOREIGN PATENT DOCUMENTS

| | | |
|---|---|---|
| CN | 103899661 A | 7/2014 |
| JP | 2001-315084 A | 11/2001 |
| JP | 2002-046035 A | 2/2002 |
| JP | 2002-219623 A | 8/2002 |
| JP | 2003-266252 A | 9/2003 |
| JP | 2003-282619 A | 10/2003 |
| JP | 2008-025663 A | 2/2008 |
| JP | 2008-196666 A | 8/2008 |
| JP | 2011-104682 A | 6/2011 |
| JP | 2012-004867 A | 1/2012 |
| JP | 2014-126134 A | 7/2014 |

OTHER PUBLICATIONS

JPH 03213229 Human translation, Sep. 18, 1991 Pub date.*
JP-2002219623 Machine translation, Aug. 6, 2002 Pub date.*
JP-2002219623 Human translation, Aug. 6, 2002 Pub date.*
Communication dated Nov. 21, 2017 by the Japanese Patent Office in a counterpart Japanese Patent Application No. 2014-186279.
Communication dated Jul. 2, 2018, issued by the State Intellectual Property Office of the People's Republic of China in counterpart Chinese Patent Application No. 201580061771.4.
Communication dated Aug. 1, 2018, issued by the European Patent Office in counterpart European Patent Application No. 15840652.0.

* cited by examiner

BALL BEARING ASSEMBLY METHOD AND ASSEMBLY DEVICE, AND BALL BEARING PRODUCED USING SAID ASSEMBLY METHOD

TECHNICAL FIELD

The present invention relates to a ball bearing assembly method, a ball bearing assembly device and a ball bearing produced using the assembly method.

BACKGROUND ART

An assembly process of a rolling bearing includes a ball insertion process of loading balls (rolling elements) between an outer ring and an inner ring. For example, in the case of a deep groove ball bearing, in the ball insertion process, the outer ring and the inner ring are arranged to be eccentric to each other on a horizontal plane, and the balls are inserted from a gap formed between an inner peripheral surface of the outer ring and an outer peripheral surface of the inner ring (for example, refer to Patent Documents 1 to 3).

In the ball insertion process, a ball insertion nozzle is arranged to face one end portion of the gap between the outer ring and the inner ring, and the necessary number of balls are inserted into a space between the inner ring and the outer ring through the ball insertion nozzle. In the below, the ball insertion process is described with reference to the drawings.

First, in a deep groove ball bearing assembly process of a conventional art, following sequences (1) to (3) are performed.

(1) An inner ring 301 and an outer ring 303 of the deep groove ball bearing are fixed to a base plate 305 with being eccentric to each other (refer to FIG. 17).

The base plate 305 has a crescentic protrusion 307 having a crescent shape, as seen from above. As shown with a dotted line in FIG. 17, a height H of the crescentic protrusion 307 from a surface of the base plate 305 is set to be substantially the same as a height of the lowest surface of a ball 309 when the ball 309 is correctly inserted between the inner ring 301 and the outer ring 303 (a height at which a center of a rolling surface coincides with a center of the ball).

On the base plate 305, the outer ring 303 is placed such that the crescentic protrusion 307 is located at an inner periphery side, and the inner ring 301 is placed at an inside of the outer ring 303 such that the crescentic protrusion 307 is located at an outer periphery side. The inner ring 301 and the outer ring 303 are arranged with the crescentic protrusion 307 being positioned therebetween, and the inner ring 301 is moved in a radially opposite direction to the crescentic protrusion 307, so that a wide gap serving as an insertion space of the ball 309 is secured above the crescentic protrusion 307.

(2) The ball is inserted into the insertion space (refer to FIG. 18A).

A ball insertion nozzle 311 is arranged just above (just above the insertion space) the crescentic protrusion 307 of the inner ring 301 and the outer ring 303 placed on the base plate 305. Then, a plurality of balls 309 accommodated in advance in the ball insertion nozzle 311 is inserted into the insertion space. The ball insertion nozzle 311 is formed therein with a passage 313 having an inner diameter substantially corresponding to one ball, and the necessary number of balls is inserted in advance in the passage 313. That is, the ball insertion nozzle 311 is arranged above the insertion space at a state where a ball row having the plurality of balls vertically stacked in the passage 313 is prepared, and the ball row is inserted at once into the insertion space.

At this time, the ball 309 having collided with an upper surface of the crescentic protrusion 307 is inserted into a gap space CS between the inner ring 301 and the outer ring 303 while colliding with a surrounding surface and a following ball and flows towards any one end portion along a circumferential direction in the gap space CS. In order to smoothly move the ball 309 inserted from the ball insertion nozzle 311 in the gap space CS between the inner ring 301 and the outer ring 303, a configuration may be adopted where the base plate 305 is tilted by a predetermined angle θ from the horizontal surface, as shown in FIG. 18B.

(3) The inner ring is moved (refer to FIG. 19).

The inner ring 301 arranged with being eccentric relative to the outer ring 303 is moved to a position at which it is concentric with the outer ring 303. A radial width W of the crescentic protrusion 307 is set to a width at which the crescentic protrusion is to exactly fit between the inner ring 301 and the outer ring 303 at a state where the inner ring 301 and the outer ring 303 are concentric with each other.

PRIOR ART DOCUMENTS

Patent Documents

Patent Document 1: JP-A-2008-196666
Patent Document 2: JP-A-2008-25663
Patent Document 3: JP-A-2002-219623

SUMMARY OF THE INVENTION

Problems to be Solved by the Invention

However, the ball insertion process of the deep groove ball bearing has following problems.

(1) Generation of Damage and Attachment of Dust and Foreign Matter

Since the plurality of balls are inserted at once into the gap space between the inner ring and the outer ring, the balls may be damaged due to collision of the balls and collision of the ball and a jig. Also, while the balls passes through the passage 313 in the ball insertion nozzle 311, dusts and foreign matters may be attached to the ball.

(2) Ball Jamming

In the ball insertion nozzle 311 having the above configuration, a ball jamming may occur. The ball jamming may be caused because the balls 309 supplied from the ball insertion nozzle 311 may flow more to one side of the gap space CS between the inner ring 301 and the outer ring 303, and the ball 309 remaining in the ball insertion nozzle 311 cannot be thus dropped, as shown in FIGS. 20 and 21. Since the balls 309 supplied from the ball insertion nozzle 311 cannot be actively distributed to right and left sides of the gap space CS, the balls 309 flow to only one side with a specific probability, as shown in FIG. 21, so that the ball jamming occurs. In particular, in the case of a bearing number having a large number of balls, an occurrence frequency of the ball jamming tends to increase.

In the case of the bearing number having a large number of balls, the ball 309 supplied at any initial speed from the ball insertion nozzle 311 is stalled due to friction with a raceway surface and collision of the balls. Therefore, as shown in FIG. 22, the balls 309 may stay in an area T of the gap space CS denoted with a dotted line in FIG. 22.

Depending on a weight of the ball 309 remaining in the ball insertion nozzle 311, it is not possible to move the stayed ball 309 in the circumferential direction in the gap space CS, so that the ball insertion process may not be completed.

(3) Ball Damage

As shown in FIG. 23A, the row of the plurality of balls 309 is dropped in the passage 313 of the ball insertion nozzle 311, and the leading ball 309 collides with the upper surface of the crescentic protrusion 307. At this time, as shown in FIG. 23B, the balls may be damaged due to the collision of the balls. Particularly, in the case of the bearing number having the large number of balls or the bearing number having a large ball diameter, the damage ratio of the balls 309 increases.

Regarding changes in occurrence ratios of the ball jamming and the ball damage according to the number of balls, the occurrence ratios tend to increase as the number of balls increases.

(4) The jig dedicated to the bearing number is required.

Since the ball insertion nozzle 311 is a component dedicated to the name number of the ball bearing to which the ball is to be inserted, it is required as many as the number of kinds of the bearing. Therefore, in production and assembly lines of the ball bearing, it is necessary to store and manage a plurality of the ball insertion nozzles 311, which increases the production cost of the bearing. Also, upon change of a set, it is necessary to replace the ball insertion nozzle 311, so that it is difficult to shorten the set changing time. Also, when a deviation occurs with respect to the mounting position of the ball insertion nozzle 311, the ball does not smoothly flow, which causes a trouble.

It is therefore an object of the present invention to provide a ball bearing assembly method and a ball bearing assembly device capable of preventing damage of balls to be inserted and attachment of dusts and foreign matters to the balls upon insertion of a plurality of balls into a gap space defined between an outer ring raceway surface and an inner ring raceway surface and preventing the balls from being jammed upon the insertion of the balls, and not requiring a jig dedicated to each bearing, and a ball bearing to be produced by the assembly method.

Means for Solving Problems

The present invention is configured as follows.
(1) A ball bearing assembly method to insert a plurality of balls into a gap space between an outer ring raceway surface and an inner ring raceway surface, wherein:
after forming the gap space by providing the outer ring raceway surface and the inner ring raceway surface to be eccentric to each other on a same plane,
a ball holding step of holding any ball by a ball holding mechanism arranged at a tip of a robot arm from a stocker in which the plurality of balls are aligned,
a ball transporting step of transporting the ball held by the robot arm to a ball insertion position in the gap space set according to a kind of a ball bearing, based on a control program, and
a ball insertion step of releasing the holding of the ball held by the ball holding mechanism in a state where the held ball is inserted into the gap space
are repeatedly performed by a number of balls of the ball bearing.
(2) The ball bearing assembly method of (1),
wherein the ball insertion position in the gap space is a maximum gap position where a radial gap of the gap space is maximum, and
wherein in the ball insertion step, after the held ball is inserted in the gap space at the maximum gap position, the holding of the ball is released while the ball held by the robot arm is moved in a circumferential direction along a raceway surface.
(3) The ball bearing assembly method of (2),
wherein in the ball insertion step, a moving direction of the robot arm in the circumferential direction is alternately reversed by each ball inserted.
(4) The ball bearing assembly method of (2) or (3),
wherein a target arrangement position of each of the plurality of balls is set in the control program, and
wherein in the ball insertion step, after the held ball is inserted at the maximum gap position, the held ball is moved by the robot arm to the target arrangement position of the ball, and the holding of the ball by the ball holding mechanism is released after completion of the movement.
(5) The ball bearing assembly method of one of (1) to (4),
wherein the ball bearing is a double-row ball bearing including a first ball row and a second ball row, and
wherein after a ball is inserted in the first ball row, a curved arm jig having a partial circular ring-shaped ball support part is inserted in an axial position between the first ball row and the second ball row of the double-row ball bearing, and after a ball of the second ball row is inserted on the inserted ball support part, the inserted ball of the second ball row is moved to a position deviating from the ball support part along a raceway surface, and thereafter, the curved arm jig is removed from a non-occupied area of balls of the second ball row.
(6) A ball bearing assembly device to insert a plurality of balls into a gap space between an outer ring raceway surface and an inner ring raceway surface, the device comprising:
an inner and outer ring holding unit which holds an outer ring and an inner ring in a state where the outer ring raceway surface and the inner ring raceway surface are eccentric to each other on a same plane so as to form the gap space;
a stocker in which the plurality of balls are aligned;
a ball holding mechanism which releasably holds a ball;
a robot arm which includes an arm tip arranged with the ball holding mechanism and is capable of moving to a designated position; and
a control unit which drives the robot arm and the ball holding mechanism based on a control program in which a ball insertion position in the gap space is set according to a kind of the ball bearing,
wherein the control unit controls the ball holding mechanism to hold any ball from the stocker, controls the robot arm to transport the held ball to the set ball insertion position in the gap space, and controls the ball holding mechanism to release the holding of the ball in a state where the held ball is inserted in the gap space.
(7) The ball bearing assembly device of (6),
wherein the ball holding mechanism is capable of individually releasably hold a plurality of balls.
(8) A ball bearing produced by the method of one of (1) to (5).

Effects of the Invention

According to the ball bearing assembly method and assembly device of the present invention, when inserting the plurality of balls into the gap space defined between the outer ring raceway surface and the inner ring raceway surface, the balls are individually air-transported by the robot arm. Therefore, it is possible to prevent the damage of the balls to be inserted and to suppress the attachment of the dusts and the foreign matters to the balls. Also, since the balls are not moved in the narrow passage such as the ball insertion nozzle, the friction with a wall surface of the passage and the strong collision of the balls do not occur, so that the ball damage and the ball jamming are not caused. Also, even when a kind of the ball bearing to be assembled is changed, it is possible to flexibly cope with the same according to the bearing number, so that it is possible to easily shorten the set changing time without using a dedicated jig. Thereby, it is possible to reduce the takt time and to assemble the ball bearing of high grade at low cost.

The ball bearing of the present invention becomes a product of high grade and high performance where the ball damage and the attachment of the dust and the foreign matter are little caused.

BRIEF DESCRIPTION OF THE DRAWINGS

FIGS. 3A and 3B are configuration views showing an example of a stocker, in which FIG. 3A is a side view of the stocker and FIG. 3B is a front view of a forefront part of the stocker as seen from an A direction.

DESCRIPTION OF EMBODIMENTS

Hereinafter, embodiments of the present invention will be described in detail with reference to the drawings.

Figure 1:
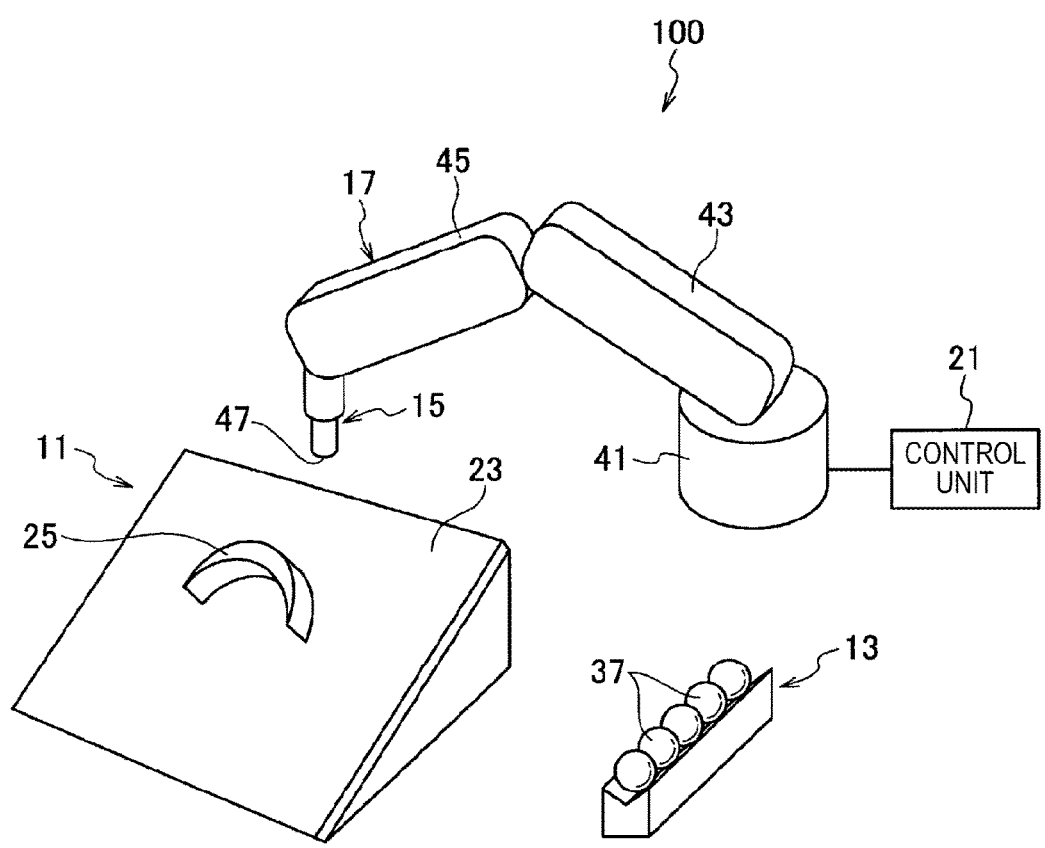
FIG. 1 is an overall configuration view schematically showing a ball bearing assembly device according to an embodiment of the present invention.

FIG. 1 is an overall configuration view schematically showing a ball bearing assembly device according to an embodiment of the present invention. A ball bearing assembly device (herein, described as a ball insertion device) 100 inserts a plurality of balls between an outer ring raceway surface and an inner ring raceway surface of a ball bearing. The ball insertion device 100 includes an inner and outer ring holding unit 11 which holds the outer ring and the inner ring with the outer ring raceway surface and the inner ring raceway surface being eccentric to each other on the same plane so as to form a gap space, a stocker 13 in which the plurality of balls are aligned, a robot arm 17 which includes an arm tip capable of moving to a designated position, a ball holding mechanism 15 which is arranged at the arm tip of the robot arm 17 and releasably holds the ball, an arm driving unit (not shown) which drives the robot arm 17, and a control unit 21.

The inner and outer ring holding unit 11 includes a base plate 23 on which the outer ring and the inner ring of the ball bearing are to be placed, and a crescentic protrusion 25 provided on a surface of the base plate 23. The crescentic protrusion 25 has the same configuration as the crescentic protrusion 307 shown in FIG. 17. In the configuration, the base plate 23 is tilted from a horizontal surface. However, as described later in detail, the base plate may be configured to be horizontal. The base plate 23 may be fixed to a base having a constant inclined angle or may be fixed to a stage of which an inclined angle can be adjusted.

Figure 2A:
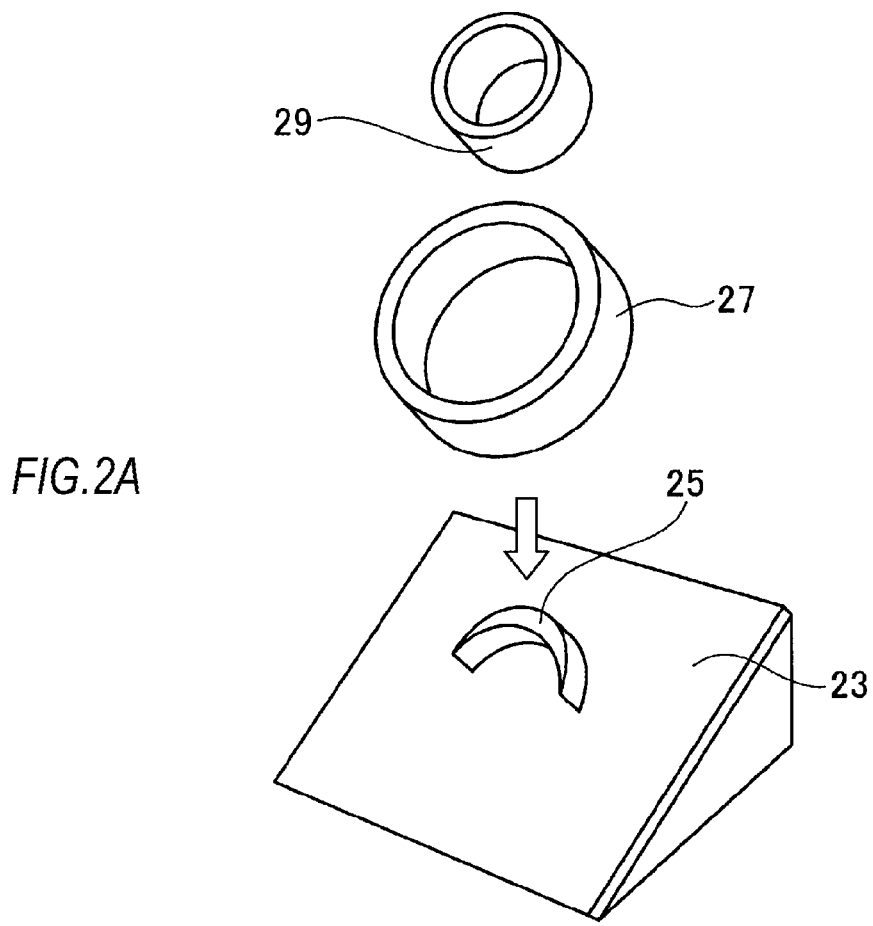
FIGS. 2A and 2B show a manner of placing an outer ring and an inner ring on a base plate.
Figure 2B:
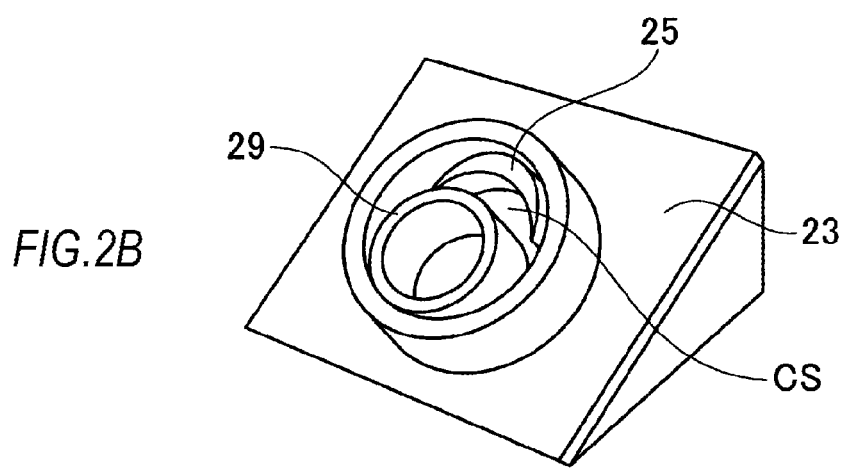

FIGS. 2A and 2B show a manner of placing an outer ring 27 and an inner ring 29 on the base plate 23. The crescentic protrusion 25 provided on the base plate 23 is engaged with an inner peripheral surface of the outer ring 27, so that the engaged outer ring 27 supports the inner ring 29 on an inner peripheral surface thereof opposite to the crescentic protrusion 25. Thereby, as shown in FIG. 2B, the outer ring 27 and the inner ring 29 are held on the surface of the base plate 23 with an outer ring rolling surface and an inner ring rolling surface being eccentric to each other on the same plane.

Figure 17:
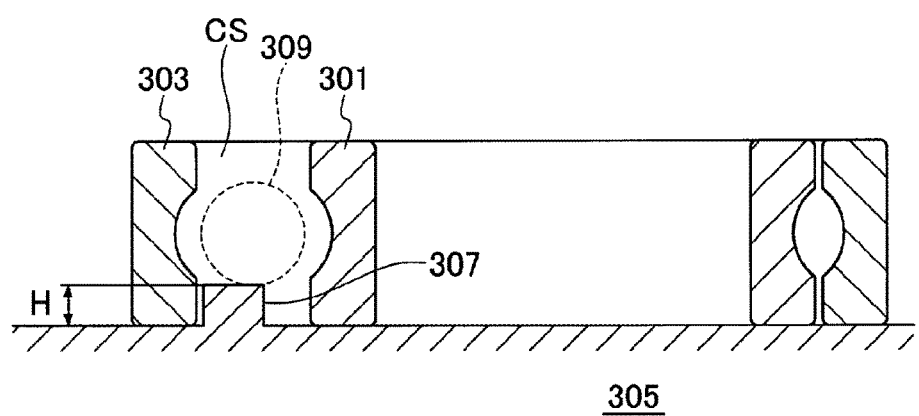
FIG. 17 is a sectional view showing a manner where an inner ring and an outer ring of a deep groove ball bearing are eccentrically arranged in a conventional art.
Figure 18A:
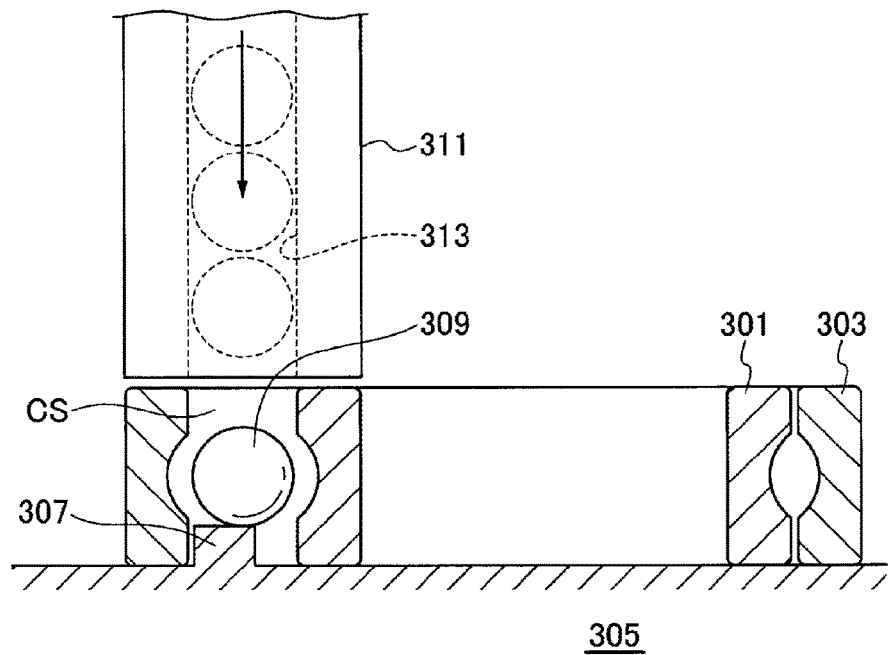
FIGS. 18A and 18B are sectional views showing a manner where balls are inserted into an insertion space of the ball bearing in a conventional art.
Figure 18B:
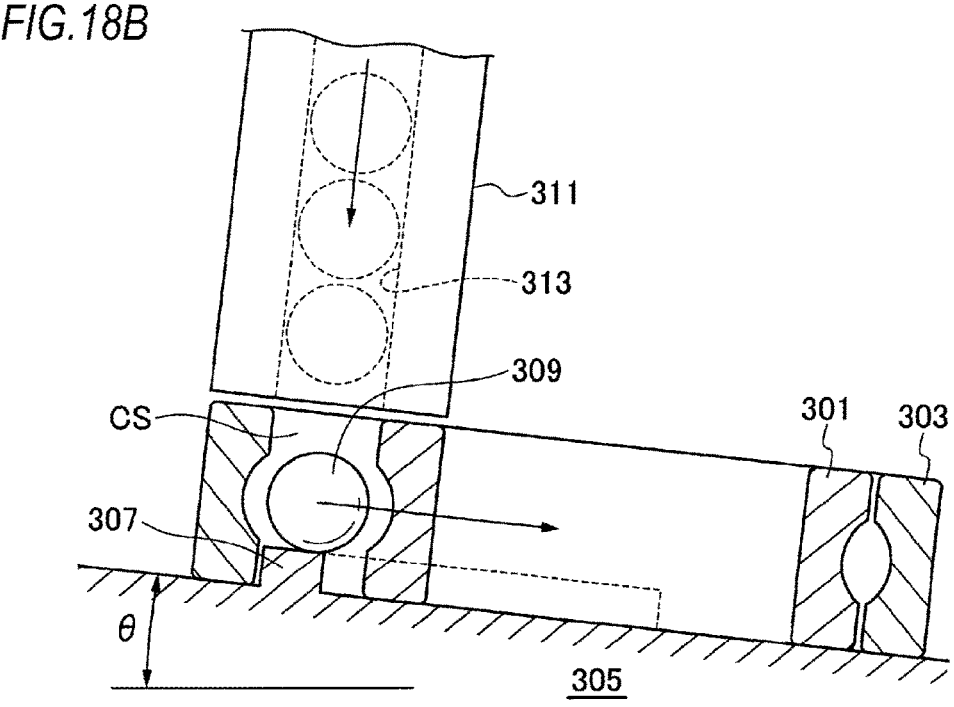
Figure 19:
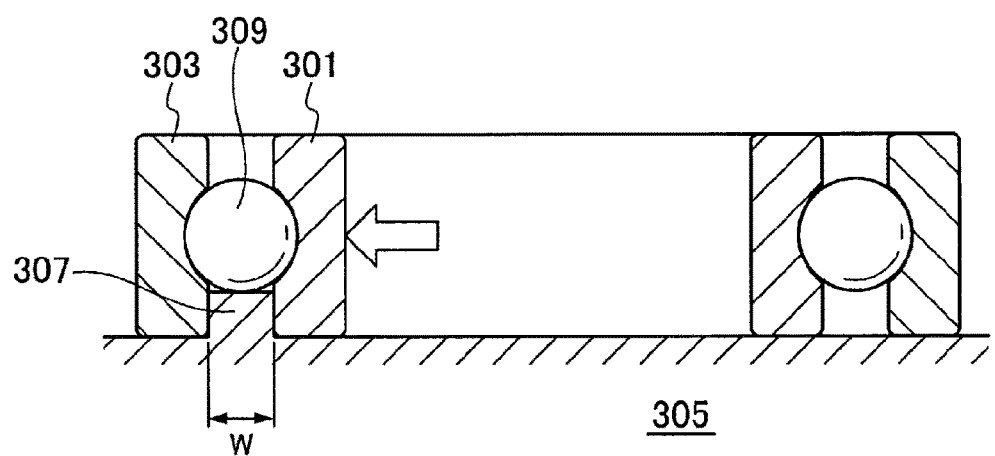
FIG. 19 is a sectional view showing a manner where the inner ring eccentrically arranged is moved to a position at which the inner ring is concentric with the outer ring in a conventional art.
Figure 20:
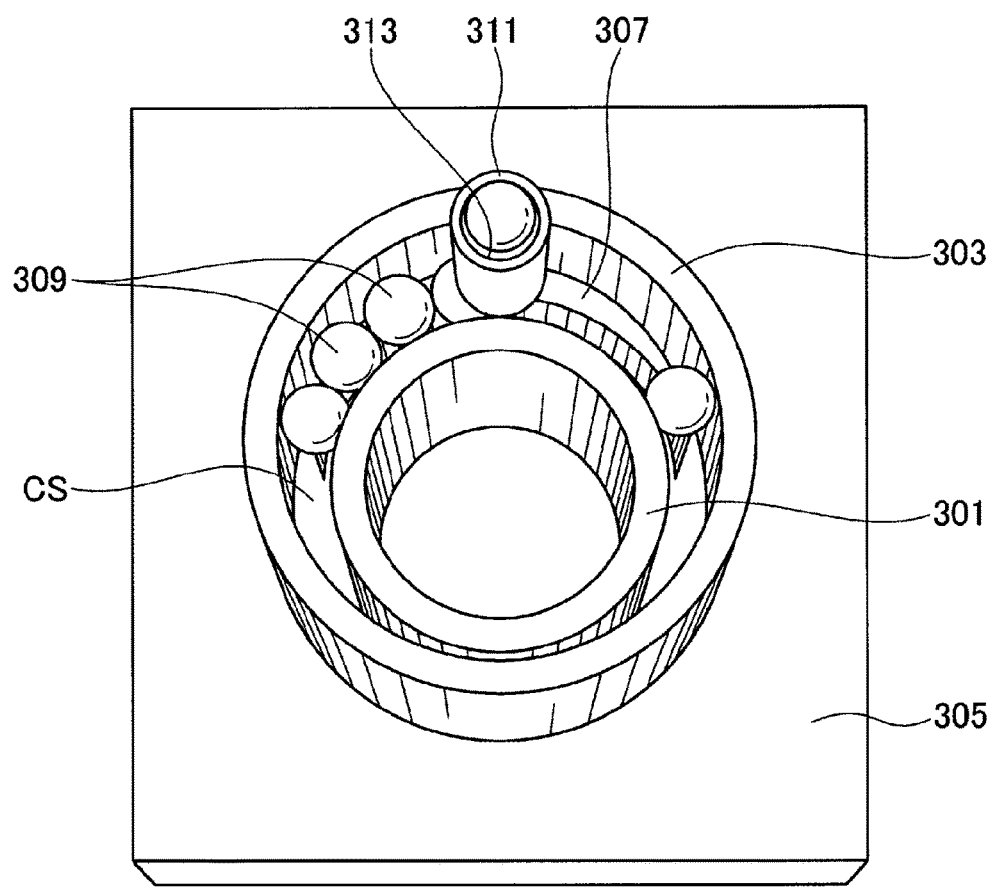
FIG. 20 shows an occurrence cause of ball jamming in a conventional art to illustrate a manner where balls supplied from a ball insertion nozzle flow more to one side of a gap space between the inner ring and the outer ring.
Figure 21:
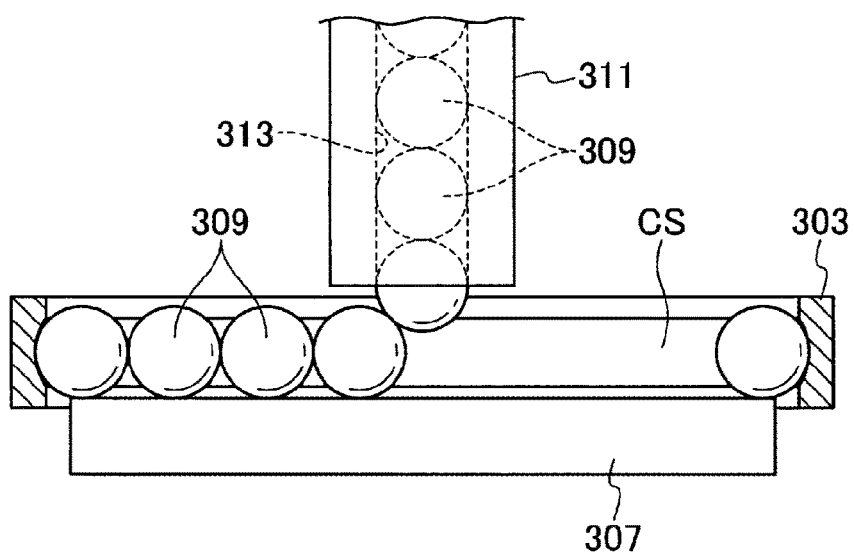
FIG. 21 is a sectional view shows an occurrence cause of the ball jamming in a conventional art to illustrate a manner where the balls supplied from the ball insertion nozzle flow more to one side of the gap space between the inner ring and the outer.
Figure 22:
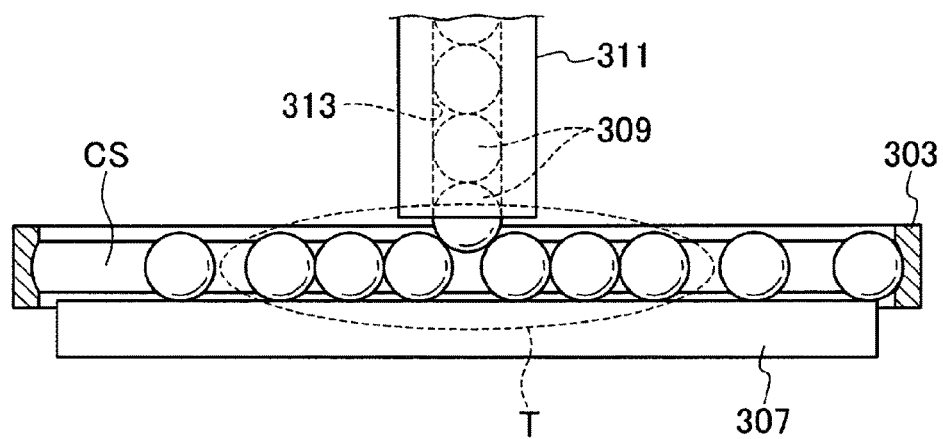
FIG. 22 is a sectional view showing a manner where the balls stay in the gap space between the inner ring and the outer ring in a conventional art.
Figure 23A:
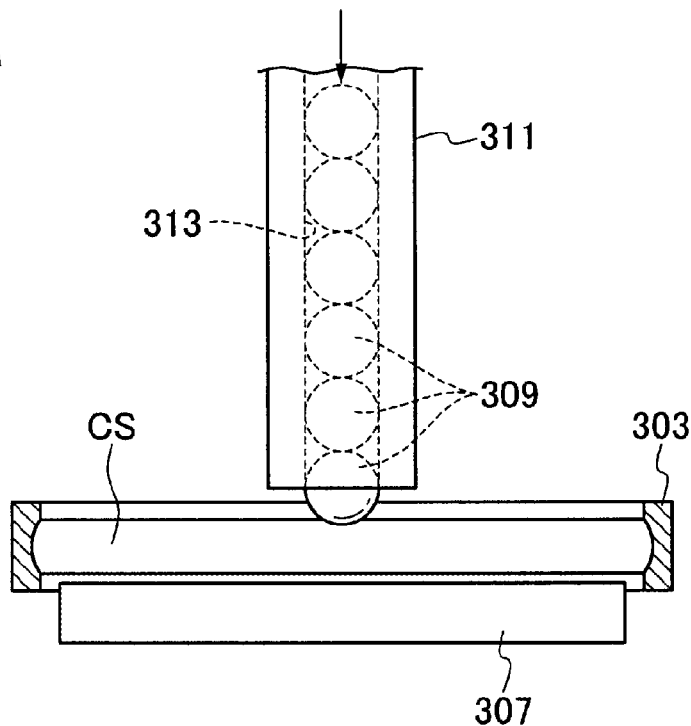
FIGS. 23A and 23B show a manner where a row of a plurality of balls is dropped in a passage of the ball insertion nozzle and collides with an upper surface of a crescentic protrusion in a conventional art.
Figure 23B:
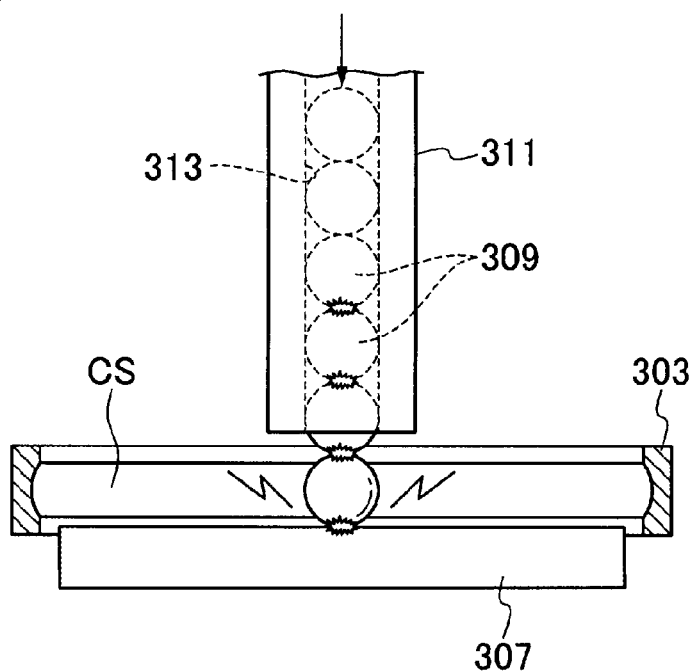

Similarly to the configuration shown in FIG. 17, a height of the crescentic protrusion 25 from the base plate 305 is set such that when a ball (not shown) is inserted between the inner ring 29 and the outer ring 27, a height of a center of the ball is the same as a height of a center of the rolling surface. When the outer ring 27 and the inner ring 29 are arranged with the crescentic protrusion 25 being positioned therebetween on the tilted base plate 23, the inner ring 29 is slipped inside the outer ring 27 until it contacts the inner peripheral surface of the outer ring, so that the outer ring 27 and the inner ring 29 are eccentrically arranged. Thereby, a gap space CS serving as an insertion space of the ball is secured above the crescentic protrusion 25. The outer ring 27 and the inner ring 29 are supplied from an inner and outer ring supply mechanism (not shown) and arranged on the base plate 23.

Figure 3A:
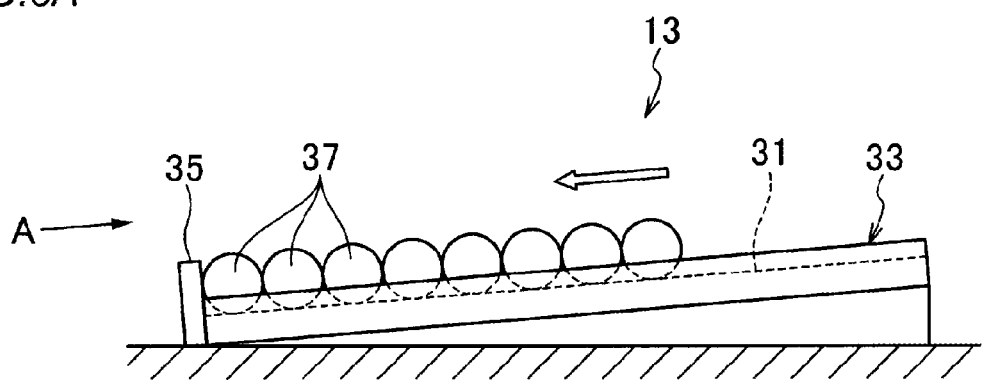
Figure 3B:
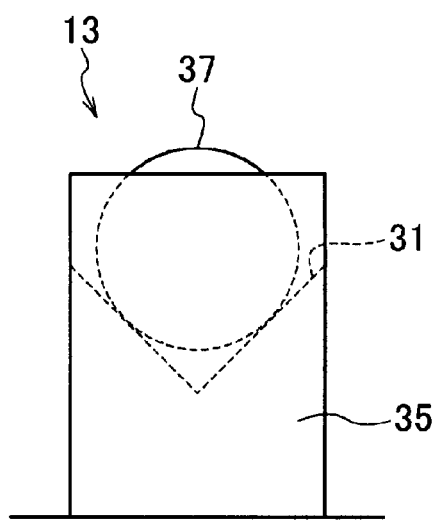

The stocker 13 holds a plurality of balls with being aligned at fixed positions such that the robot arm 17 is to pick up the balls 37. FIGS. 3A and 3B show an example of the configuration of the stocker 13. However, the type and structure of the stocker 13 are not limited thereto. FIG. 3A is a side view of the stocker 13 and FIG. 3B is a front view of a forefront part of the stocker 13 as seen from an A direction.

The stocker 13 includes an inclined rail 33 having a V-shaped groove 31 and a stopper 35 arranged at the lowest end portion of the rail 33. In the V-shaped groove 31, the plurality of balls 37 are placed. The balls 37 move downwards by own weights thereof, and the lowest ball 37 is always in contact with the stopper 35. Thereby, each ball 37 is automatically aligned and positioned on the rail 33. Therefore, when the lowest ball 37 is picked up by the robot arm 17, the ball 37 which is a next lowest ball moves to the position at which it is in contact with the stopper 35.

As shown in FIG. 1, the robot arm 17 has a multiple joint mechanism, and a ball holding mechanism 15 which holds the ball 37 is provided at a tip end portion of the arm. The robot arm 17 repeatedly supplies the ball 37 towards the bearing while reciprocating between a position of the stocker 13 and a predetermined position of the inner and outer ring holding unit 11 (a gap space defined between raceway surfaces of the outer ring 27 and the inner ring 29, which will be described later).

The robot arm 17 includes a first arm 43 connected at a base end to the base 41 and a second arm 45 connected at a base end to the first arm 43 and connected at a tip end to the ball holding mechanism 15. The base 41 and the first arm 43, and the first arm 43 and the second arm 45 are respectively interconnected to be rotatable by actuators (not shown). In the meantime, the robot arm 17 is not particularly limited but preferably operates at high speed.

The actuator arranged at each joint of the robot arm 17 individually operates based on an arm driving signal from the control unit 21, which is to be input to an arm driving unit. As the actuator, a servo motor, a hydraulic or pneumatic cylinder or the like may be used, for example.

The ball holding mechanism 15 is a vacuum suction mechanism having a suction pad 47 arranged at the tip of the robot arm 17 and releasably suction only one ball 37. The ball holding mechanism 15 suction-holds and releases the holding of the ball 37 based on a holding signal and a holding release signal from the control unit 21.

The ball holding mechanism 15 is not limited to the vacuum suction type. For example, the other types such as a type of using a magnetic force and a mechanical chuck type of two claws, three claws or the like may also be adopted. A gripping force of the ball holding mechanism 15 may be such a gripping force that can bear an acceleration to be applied to the ball 37 being transported.

The control unit 21 outputs driving signals to the arm driving unit and the ball holding mechanism 15 and respectively drives the robot arm 17 and the ball holding mechanism 15, based on a control program corresponding to a kind of the ball bearing to be assembled. Specifically, the control unit 21 causes any one ball 37 from the stocker 13 to be held at the ball holding mechanism 15 and to transport the held ball 37 to a predetermined position of the inner and outer ring holding unit 11. The control unit 21 releases the holding of the ball 37 held by the ball holding mechanism 15 at a transporting destination position. The control unit 21 repeatedly performs the above operations as many times as the number of balls of the ball bearing.

Figure 4:
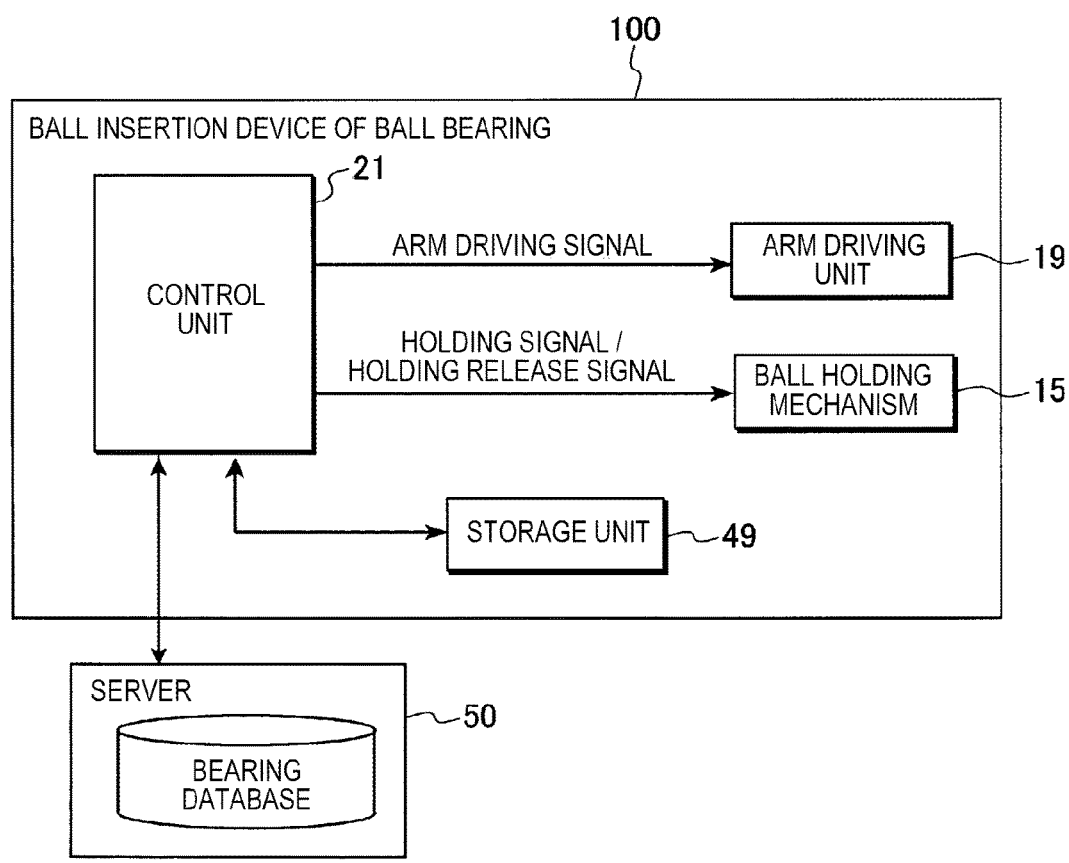
FIG. 4 is a control block diagram of a ball insertion device of a ball bearing.

FIG. 4 shows a control block diagram of the ball insertion device 100 of the ball bearing. The ball insertion device 100 of the ball bearing includes the control unit 21, the arm driving unit 19, the ball holding mechanism 15, and a storage unit 49 which stores a control program for executing ball insertion sequences to be described later. The ball insertion device 100 of the ball bearing is connected to a server 50 having a bearing database of a variety of specification information including a size of a bearing, the number of balls and the like set for each bearing number.

The server 50 outputs information of a program number, which corresponds to a bearing number of the ball bearing which is a ball insertion target, to the control unit 21. The control unit 21 selectively executes a control program designated from a plurality of control programs prepared in advance in the storage unit 49, based on the information of the program number input from the server 50. The control unit 21 may inquire the server 50 about a variety of specification information of the ball bearing and uses the obtained information for execution of the control program, as necessary.

The control unit 21 is a computer device (information processing device) including a CPU, a memory, an I/O interface and the like, such as a personal computer and a programmable controller, and the storage unit 49 is a storage means configured by a variety of recording media such as a hard disk drive, a memory and the like.

The arm driving unit 19 drives each actuator (not shown) of the robot arm 17, based on the arm driving signal output from the control unit 21. The ball holding mechanism 15 performs the suction so as to suction and hold the ball 37 to the suction pad 47 and to stop the suction so as to release the suction and holding of the ball 37 by opening or closing a valve connected to a suction pump (not shown), based on the holding signal or the holding release signal output from the control unit 21.

<First Ball Insertion Sequence>

Subsequently, a ball insertion sequence which is to be executed by the ball insertion device 100 of the ball bearing is described.

First, as shown in FIGS. 2A and 2B, the outer ring 27 and the inner ring 29 are set on the base plate 23. The outer ring 27 is placed at a position on the base plate 23 at which the crescentic protrusion 25 is located at an inner periphery side of the outer ring, and the inner ring 29 is placed at an inner periphery side of the outer ring 27 at which the crescentic protrusion 25 is located at an outer periphery side of the inner ring.

The base plate 23 is tilted such that the inner peripheral surface of the outer ring 27 is engaged with the crescentic protrusion 25 on the tilted base plate 23. The inner ring 29 is slipped until the lower outer peripheral surface of the inner ring is contacted to the inner peripheral surface of the outer ring. Thereby, the outer ring 27 and the inner ring 29 are arranged on the base plate 23 with the raceway surfaces thereof being eccentric to each other on the same plane. The inner ring 29 has a radial moving margin between the inner peripheral surface of the outer ring and the crescentic protrusion 25.

The information of the bearing number (an identification number indicative of a kind of the bearing) corresponding to the outer ring 27 and the inner ring 29 to be assembled is input in advance to the control unit 21 of FIG. 1 by an operator of the ball insertion device 100 or an instruction signal of bearing production to be input to the ball insertion device 100. The base plate 23 has the crescentic protrusion 25 having a shape suitable for the input bearing number.

In the first ball insertion sequence of the ball bearing, following steps (1) to (3) are repeatedly performed until all the predetermined number of balls 37 prescribed in the bearing number are inserted to the gap space CS between the outer ring 27 and the inner ring 29. Each step is executed by the control program stored in the storage unit 49 of FIG. 4. Meanwhile, in the control program, a space coordinate of a ball insertion position of the gap space CS corresponding to a kind of the ball bearing is preset.

(1) A ball holding step of holding any ball 37 by the ball holding mechanism 15 from the stocker 13.

(2) A ball transporting step of transporting the ball 37 held by the ball holding mechanism 15 to the ball insertion position in the gap space CS by the robot arm 17.

(3) A ball insertion step of releasing the holding of the ball 37 held by the ball holding mechanism 15 in a state where the held ball 37 is inserted in the gap space CS.

Figure 5A:
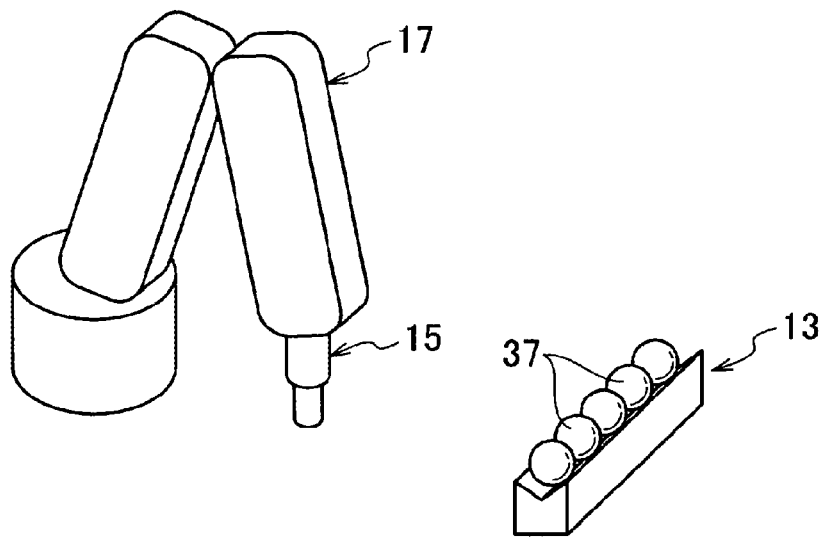
FIGS. 5A, 5B and 5C shown operations of a robot arm in each step of a ball holding step.
Figure 5B:
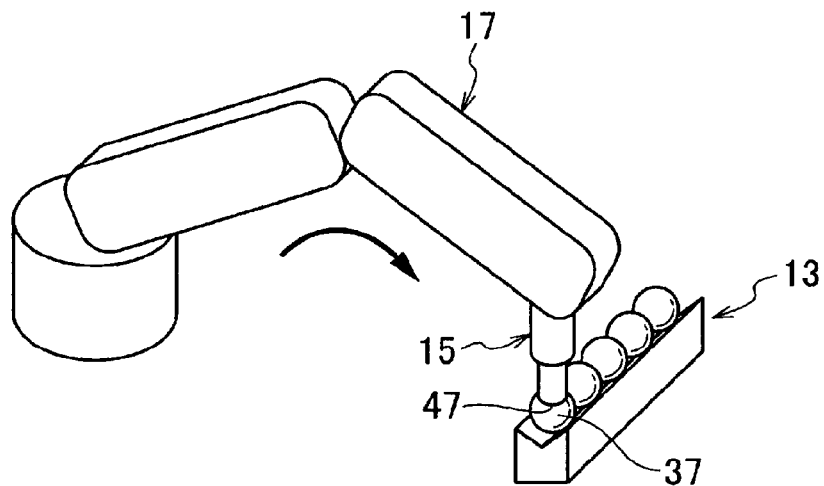
Figure 5C:
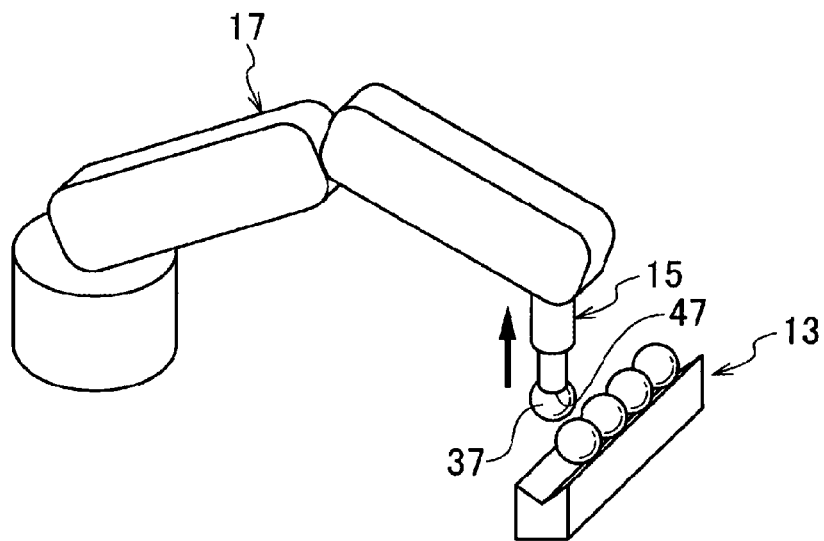

In the ball holding step (1), one ball 37 aligned in the stocker 13 is suctioned and held by the ball holding mechanism 15 provided at the tip end portion of the robot arm 17. FIGS. 5A, 5B and 5C show operations of the robot arm 17 in each step of the ball holding step.

The control unit 21 (refer to FIG. 4) outputs the arm driving signal for suctioning and holding the ball 37 to the arm driving unit 19 when the arrangement of the inner and outer rings on the inner and outer ring holding unit 11 is completed. The arm driving unit 19 drives the robot arm 17 to move the ball holding mechanism 15 provided at the arm tip from a current posture exemplarily shown in FIG. 5A to a position just above the ball 37 in the stocker 13, as shown in FIG. 5B, based on the input driving signal. Then, the control unit 21 outputs the holding signal to the ball holding mechanism 15 and causes the suction pad 47 to suction one ball 37. Then, as shown in FIG. 5C, the arm driving unit 19 raises the robot arm 17 to pick up the one ball 37 from the stocker 13.

In the ball transporting step (2), the robot arm 17 transports the ball 37 suctioned and held by the ball holding mechanism 15 provided at the arm tip from the position of the stocker 13 to the ball insertion position of the gap space CS formed between the raceway surfaces of the outer ring 27 and the inner ring 29.

Figure 6A:
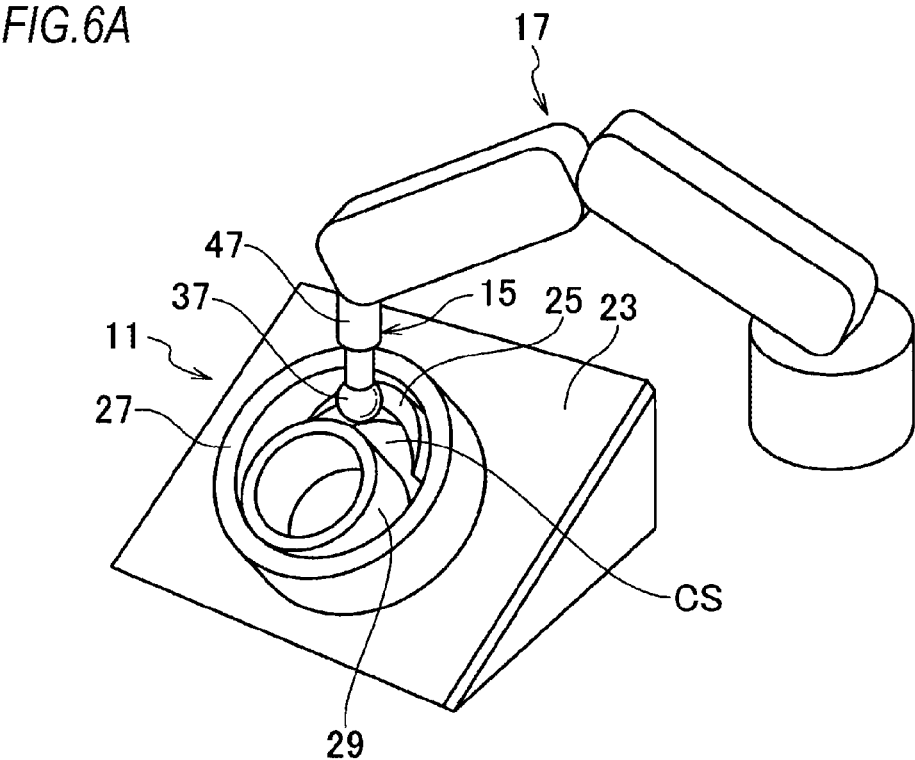
FIG. 6A shows the operation of the robot arm in a ball transporting step and FIG. 6B shows the operation of the robot arm in a ball insertion step.

FIG. 6A shows the operation of the robot arm 17 in the ball transporting step. When the ball holding step is completed, the control unit 21 (refer to FIG. 4) outputs the arm driving signal for transporting the ball to the arm driving unit 19. The arm driving unit 19 drives the robot arm 17, based on the input driving signal, and transports the ball 37 suctioned and held by the ball holding mechanism 15 from the position of the stocker 13 to the ball insertion position of the gap space CS between the raceway surfaces of the outer ring 27 and the inner ring 29 placed on the inner and outer ring holding unit 11.

The ball insertion position of the gap space CS is preset in the control program, which is to be selected by the control unit 21 based on the instruction from the server 50, and the robot arm 17 transports the ball 37 to the set ball insertion position. That is, the control programs corresponding to the various ball bearings to be produced are prepared in advance based on the information of the bearing database of the server 50 and are stored in the storage unit 49. The control unit 21 executes the control program, which corresponds to the ball bearing to be assembled designated by the server 50, of the plurality of prepared control programs. Thereby, it is possible to correctly transport the ball 37 to the ball insertion position of the gap space CS suitable for the ball bearing to be assembled.

Figure 6B:
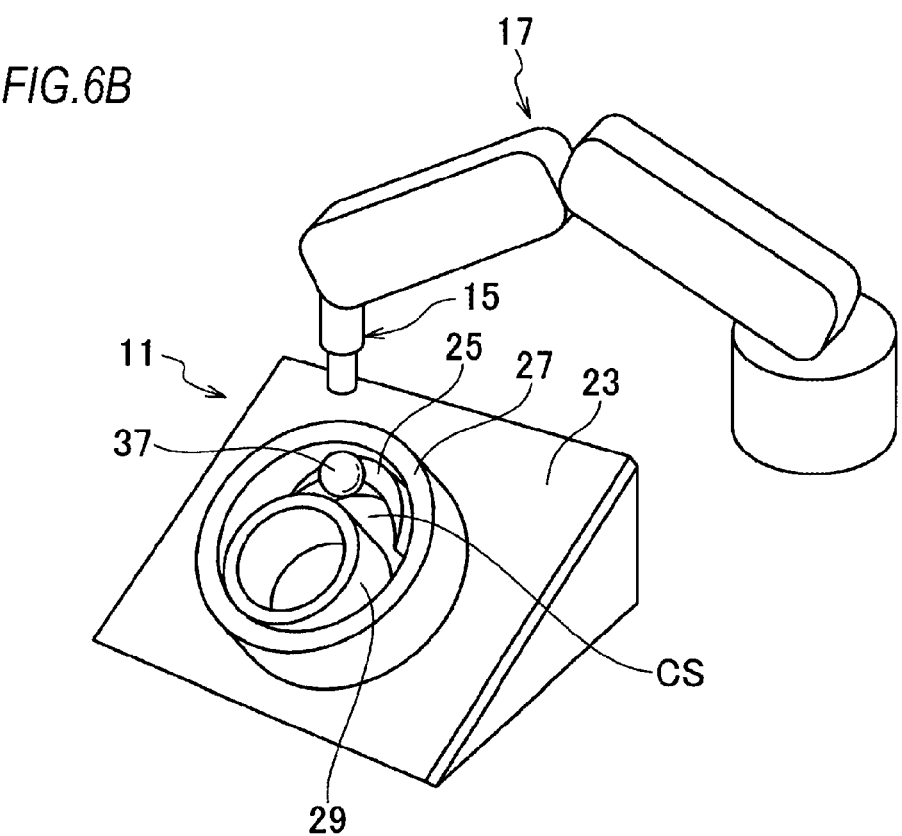

In the ball insertion step (3), the ball 37 suctioned and held by the ball holding mechanism 15 is released in the gap space CS between the raceway surfaces, so that the ball 37 is inserted into the gap space CS. FIG. 6B shows the operation of the robot arm 17 in the ball insertion step. The control unit 21 (refer to FIG. 4) drives the ball holding mechanism 15 to release the holding of the ball 37 held at the suction pad 47 and inserts the ball 37 onto the crescentic protrusion 25, which is the ball insertion position in the gap space CS.

In the meantime, the control unit 21 controls the held ball 37 not to contact the other members such as the outer ring 27 and the inner ring 29 when inserting the ball 37 held by the ball holding mechanism 15 into the gap space CS. That is, the control unit 21 drives the robot arm 17 with keeping a distance between the surface of the ball 37 and the other members by a predetermined interval or greater. Thereby, it is possible to securely prevent the ball 37 from interfering with the surrounding members upon the driving of the robot arm 17 and the ball 37 from being damaged. The control of preventing the held ball 37 from contacting the other members is also performed in the same manner in the other ball insertion sequences to be described later.

Then, the control unit 21 repeatedly executes the respective steps (1), (2) and (3) as many times as the number of balls prescribed in the bearing number corresponding to the ball bearing to be assembled.

Subsequently, the operational effects of the ball insertion device 100 of the ball bearing are described.

The ball insertion device 100 of the ball bearing transports the ball 37 arranged in the stocker 13 from the position of the stocker 13 to the ball insertion position of the gap space CS between the raceway surfaces by the robot arm 17 and inserts the ball 37 to the ball insertion position. In the conventional art, since the size of the bearing and the number of the balls are different for each bearing number, it is necessary to prepare a corresponding ball insertion jig and to fix the same to a predetermined position. However, according to the above configuration, the robot arm 17 reciprocates between the position of the stocker 13 and the ball insertion position of the gap space CS, in accordance with the control program. Therefore, it is possible to continuously insert the ball 37 to the ball insertion position suitable for each bearing number simply and correctly.

That is, upon the change of the set, the information of the program number is input from the server 50 (refer to FIG. 4) to the control unit 21, and the control unit 21 selectively executes the control program corresponding to the name number of the bearing to be assembled. Therefore, it is possible to shorten the set changing time and to reduce the takt time. Also, according to the above configuration, it is not necessary to perform a troublesome operation of selecting a desired jig from a plurality of jigs and to replace the same. Also, it is not necessary to prepare in advance a plurality of ball insertion jigs, which contributes to the cost saving of the manufacturing facility.

According to the conventional method of preparing a plurality of ball insertion jigs, a spare jig is also prepared in advance so as to immediately replace the same ball insertion jig upon occurrence of a problem. For this reason, it is necessary to secure a wide space for storing the jigs. However, according to the above configuration, it is not necessary to prepare the jig itself, so that it is possible to save a space and to perform the production in high efficiency.

Also, the base plate 23 is tilted such that the ball 37 inserted into the gap space CS is dropped to one circumferential end side of the gap space CS having the crescentic shape by the own weight of the ball 37 and the ball 37 is not thus jammed. As compared to the conventional configuration where the plurality of balls are sent at once to the gap space CS, according to the above configuration, the ball 37 simply free-falls, so that the damage of the ball 37 due to a mechanically added force is not caused.

Also, the ball 37 is air-transported from the position of the stocker 13 to the ball insertion position of the gap space CS by the robot arm 17, without contacting the other members. Therefore, the ball 37 does not interfere with the other members, so that the ball 37 is prevented from being damaged and the attachment of the dust and the foreign matter to the surface of the ball 37 is suppressed.

<Other Configuration Examples of Robot Arm>

As the robot arm 17 which is to be used for the ball insertion device 100 of the ball bearing, a variety of mechanisms can be adopted, in addition to the multiple joint robot arm 17 shown in FIG. 1. For example, a parallel link type robot, a single shaft robot, an orthogonal robot configured by orthogonal slide shafts of two shafts or three shafts, and the like may be adopted. Among others, a parallel link type robot which can operate at high speed may be favorably used.

Figure 7:
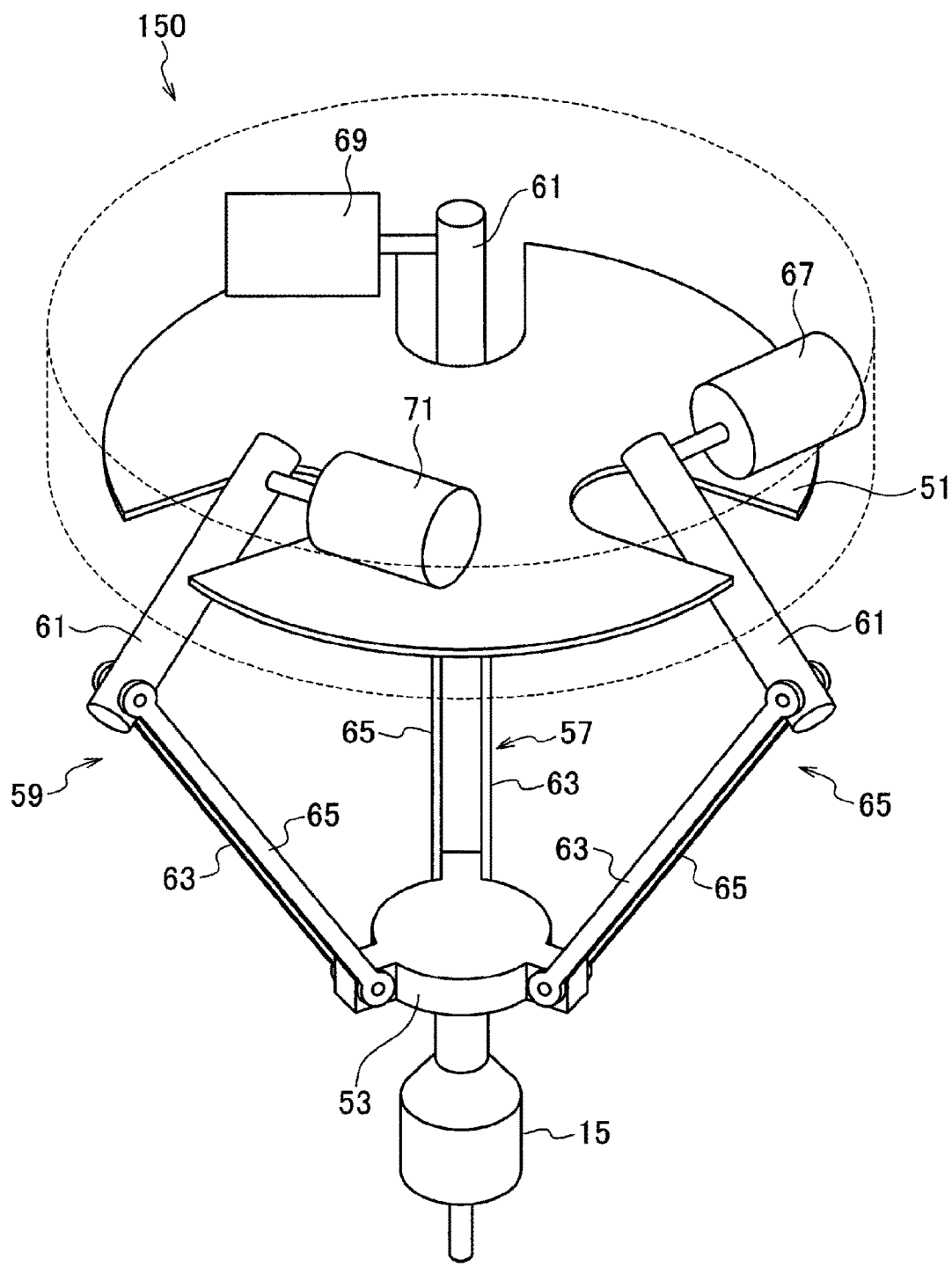
FIG. 7 is a schematic configuration view of a parallel link type robot.

FIG. 7 is a schematic configuration view of a parallel link type robot. A parallel link type robot 150 mainly includes a base part 51, a movable plate 53, and three link parts 55, 57, 59 which couple the base part 51 and the movable plate 53. The movable plate 53 is mounted with the ball holding mechanism 15.

The link part 55 includes a driving-side link member 61 extending from the base part 51 and two passive-side link members 63, 65 extending from the movable plate 53, and the driving-side link member and the passive-side link members are coupled. Also, the base part 51 is arranged thereon with an actuator 67 which drives the driving-side link member 61. In the meantime, since the configurations of the other link parts 57, 59 are the same as the link part 55, the descriptions thereof are omitted. It is possible to move and position the movable plate 53 to a desired position at high speed with three degrees of freedom by individually driving the actuators 67, 69, 71 of the link parts 55, 57, 59.

<Other Configuration Examples of Ball Holding Mechanism>

Figure 8A:
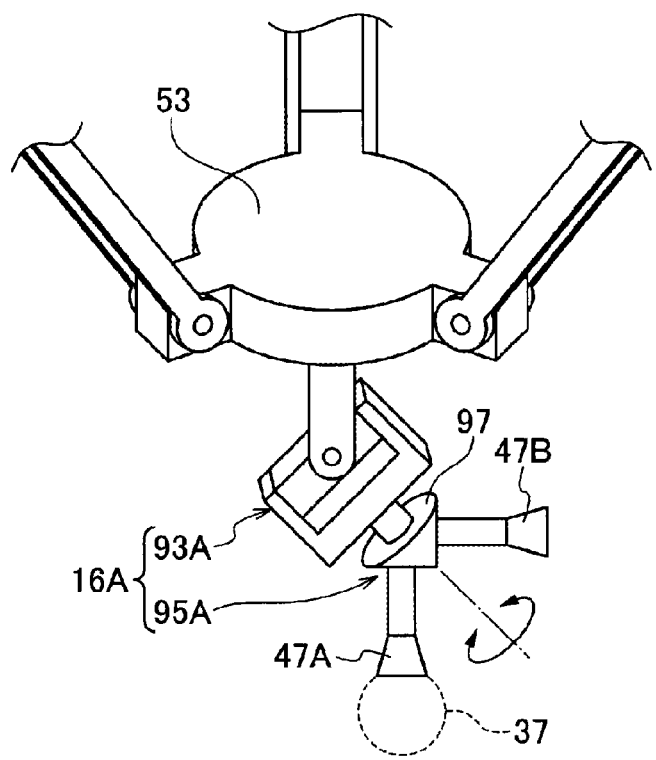
FIGS. 8A and 8B are schematic configuration views of a ball holding mechanism which suctions and holds a plurality of balls.
Figure 8B:
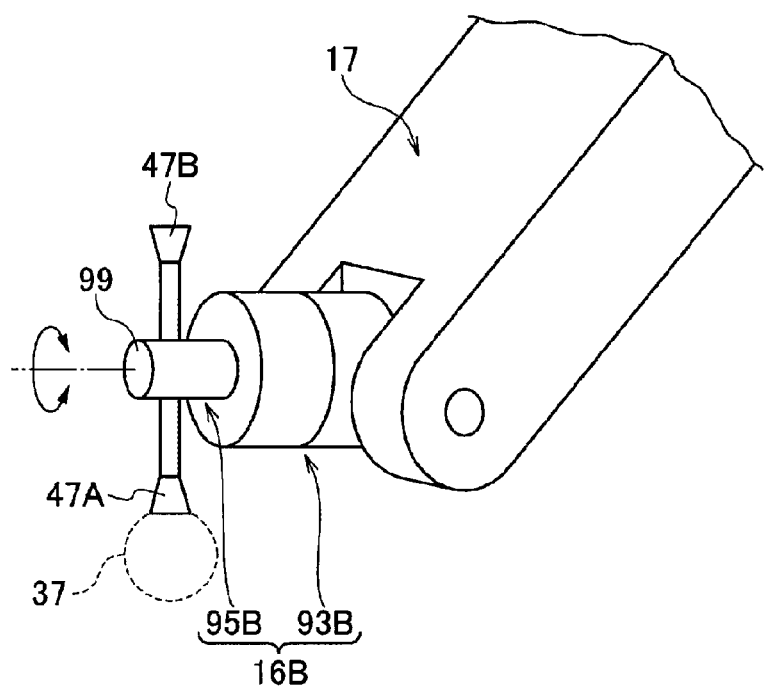

The ball holding mechanism 15 suctions one ball 37 but may suction a plurality of balls 37 at the same time. FIGS. 8A and 8B are schematic configuration views of a ball holding mechanism which suctions and holds the plurality of balls. A ball holding mechanism 16A shown in FIG. 8A includes a coupling part 93A mounted to the movable plate 53 of the parallel link type robot 150 and a rotation suction part 95A rotatably connected to the coupling part 93A.

The coupling part 93A is a universal joint and changes an inclined angle of the rotation suction part 95 relative to the movable plate 53, and the like. The rotation suction part 95A is provided with suction pads 47A, 47B via pillar bodies at two places of a side surface of a conical block 97. The respective suction pads 47A, 47B are arranged at 180° rotation positions of the conical block 97. In the meantime, the coupling part 93A may be configured by a gear mechanism, instead of the universal joint.

Each of the suction pads 47A, 47B is connected with an air suction passage (not shown), and the suction of the ball holding mechanism 16A becomes on or off by a driving signal from the control unit 21. According to the configuration of the ball holding mechanism 16A, it is possible to hold the balls 37 at the respective suction pads 47A, 47B at the same time. Further, while picking up the balls 37 from the stocker 13, it is possible to transport the balls 37 at once with the two balls 37 being suctioned. As a result, it is possible to reduce the number of reciprocation times of the robot arm 17 from the stocker 13 to the ball insertion position and to thereby perform the ball insertion step at higher speed.

A ball holding mechanism 16B shown in FIG. 8B includes a coupling part 93B mounted to the tip of the robot arm 17 shown in FIG. 1 and a rotation suction part 95B rotatably connected to the coupling part 93B. The rotation suction part 95B is provided with the suction pads 47A, 47B via pillar bodies at two places of a rotary shaft 99. In this case, the suction pads 47A, 47B are arranged at 180° rotation positions of the rotary shaft 99. In this configuration also, it is possible to hold the balls 37 at the respective suction pads 47A, 47B, so that it is possible to achieve the same operational effects as the configuration shown in FIG. 8A. In the meantime, the number of the balls to be suctioned may be three or more.

<Second Ball Insertion Sequence>

Subsequently, a second ball insertion sequence which is to be performed by the ball insertion device 100 of the ball bearing is described.

In the first ball insertion sequence, the outer ring 27 and the inner ring 29 are eccentrically arranged. The reason is that each raceway surface of the inner and outer rings is formed with the groove shoulder and the ball 37 interferes with the groove shoulders and cannot be inserted into the gap space between the raceway surfaces if the inner and outer rings are concentrically arranged. However, even when the outer ring 27 and the inner ring 29 are eccentrically arranged, an area in which the balls 37 can be inserted into the gap space CS between the raceway surfaces is limited.

Figure 9:
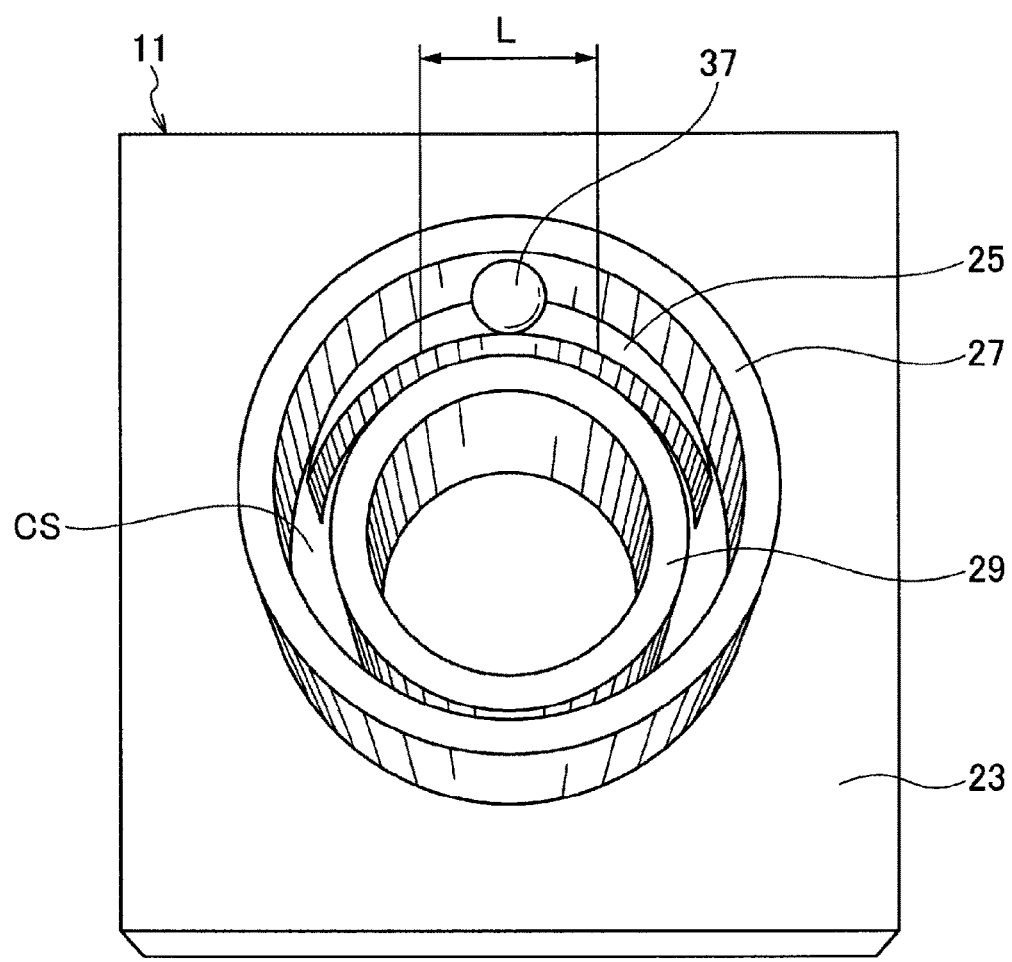
FIG. 9 shows an area in which balls can be inserted into a gap space between the outer ring and the inner ring.

As shown in FIG. 9, the area in which the balls 37 can be inserted into the gap space CS having the crescentic shape between the outer ring 27 and the inner ring 29 is determined by an inner diameter of the outer ring 27, an outer diameter of the inner ring 29 and a diameter of the ball 37. In general, an area 1.5 to 2.5 times as large as the ball diameter along the circumferential direction in the vicinity of a center of the gap space CS between the inner and outer rings is an insertable area. A range of a length L in FIG. 9 is the insertable area and includes a maximum gap position at which a radial gap is largest.

As described above, since the insertable area is a narrow range, it is not possible to insert a next ball unless the ball 37 first inserted is moved to another place in the gap space CS. As described above, when the base plate 23 is tilted, the inserted ball 37 moves to one side in the circumferential direction of the gap space CS by the own weight thereof. However, in this case, a structure or mechanism for tilting the base plate 23 is required. Also, after the ball is inserted, it is not possible to perform a process of moving the inner ring at a subsequent stage, as it is.

Therefore, in the second ball insertion sequence, when the ball holding mechanism 15 releases the holding of the ball 37, the holding is released while moving the ball 37 to one side in the circumferential direction of the inner and outer rings. Thereby, the ball 37 is discharged into the gap space CS with an initial speed. Accordingly, a ball insertion space of a next ball 37 is securely provided at the ball insertion position of the gap space CS. Therefore, it is possible to prevent the ball 37 from staying and to simplify the configuration of the device without tilting the base plate 23.

The server 50 (refer to FIG. 4) outputs the control program number corresponding to the bearing number to the control unit 21 in the same manner as described above and the control unit 21 executes the instructed control program, so that the second ball insertion sequence is performed. Meanwhile, in below descriptions, the members common to the members described in the first ball insertion sequence are denoted with the same reference numerals and the descriptions thereof are simplified or omitted.

Figure 10A:
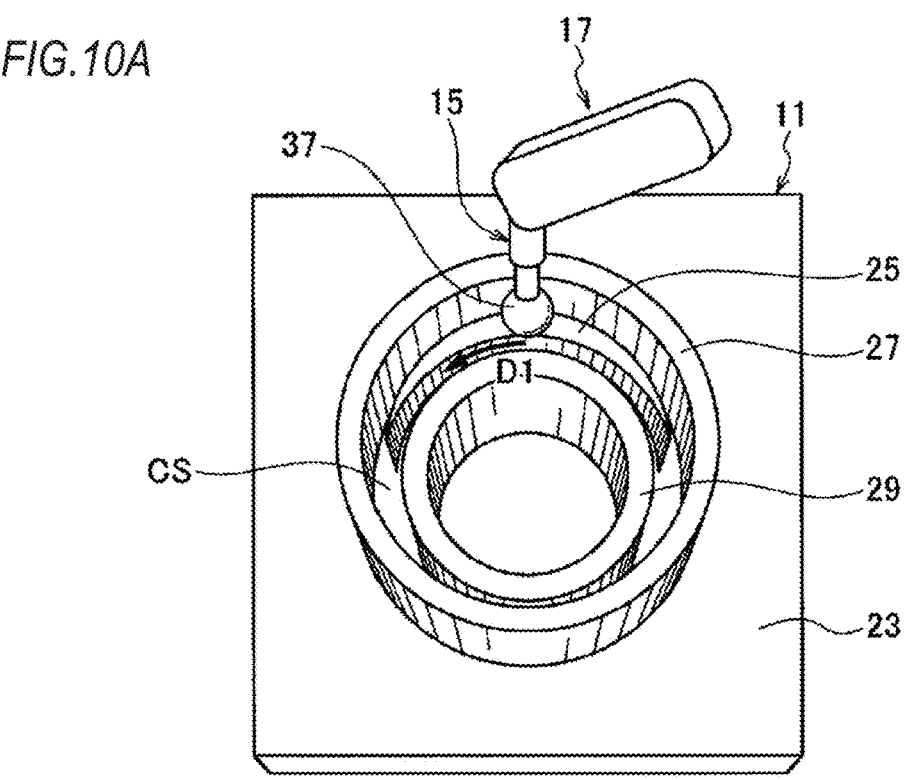
FIGS. 10A and 10B show a second ball insertion sequence of the ball bearing device.
Figure 10B:
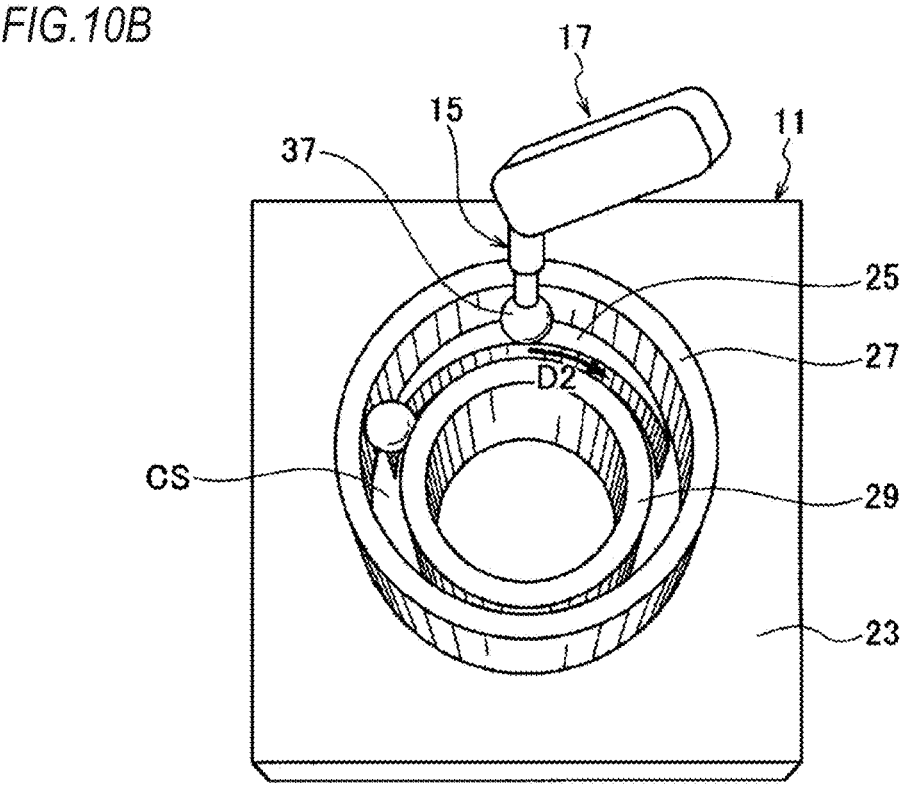

FIGS. 10A and 10B show the second ball insertion sequence of the ball bearing device. In the second ball insertion sequence, the control unit 21 (refer to FIG. 4) outputs the arm driving signal to the arm driving unit 19, and the arm driving unit 19 drives the robot arm 17 based on the input arm driving signal, thereby moving the arm tip to the position of the stocker 13. The control unit 21 outputs the holding signal to the ball holding mechanism 15, and the ball holding mechanism 15 suctions and holds the ball 37 from the stocker 13.

Then, the arm driving unit 19 transports the suctioned and held ball 37 to the ball insertion position of the gap space CS between the outer ring 27 and the inner ring 29 by the robot arm 17 and inserts the ball from the ball insertion position of the gap space CS into the gap space CS. At this insertion point of time, the ball holding mechanism 15 continues to hold the ball 37. The sequence thus far is the same as the above-described sequence.

Then, as shown in FIG. 10A, the arm driving unit 19 drives the robot arm 17 to move the ball 37 held at the ball holding mechanism 15 towards one direction (an arrow D1 direction in FIG. 10A) along the circumferential direction of the gap space CS. During the movement of the ball, the control unit 21 outputs the holding release signal, and the ball holding mechanism 15 releases the holding of the ball 37 at a timing at which the holding release signal is received. The released ball 37 travels towards an end portion in the circumferential direction in the gap space CS with an initial speed. Thereby, the ball 37 is not stayed in the vicinity of the center, which is the ball insertion position of the gap space CS.

Continuously, the control unit 21 outputs the arm driving signal to the arm driving unit 19 for transporting a next ball. The arm driving unit 19 returns the robot arm 17 to the position of the stocker 13 based on the input arm driving signal, holds the ball 37 from the stocker 13, and again transports the ball 37 to the ball insertion position of the gap space CS of the inner and outer ring holding unit 11.

Then, as shown in FIG. 10B, the arm driving unit 19 moves the ball 37 held at the ball holding mechanism 15 towards the other direction (an arrow D2 direction in FIG. 10B) along the circumferential direction of the gap space CS. During the movement of the ball, the control unit 21 outputs the holding release signal, and the ball holding mechanism 15 releases the holding of the ball 37 at a timing at which the holding release signal is received. The released ball 37 travels towards an end portion in the circumferential direction in the gap space CS with an initial speed. At this time, the ball 37 is not stayed at the ball insertion position of the gap space CS.

The control unit 21 repeats the insertion of the ball 37 into the gap space CS and equally distributes the balls 37 in the D1 and D2 directions in the gap space CS.

According to the second ball insertion sequence, since the ball 37 is not stayed in the vicinity of the center in the circumferential direction of the gap space CS even though the base plate 23 is not tilted, it is possible to prevent the ball 37 from being damaged or the production process from being stopped due to the ball jamming. Also, since the balls 37 are alternately reversed and arranged at both ends in the circumferential direction of the gap space CS, the balls 37 are not unequally gathered only at one side, so that it is possible to prevent the ball jamming.

<Third Ball Insertion Sequence>

Subsequently, a third ball insertion sequence which is to be performed by the ball insertion device of the ball bearing is described.

In the above-described ball insertion sequences of the ball bearing, the ball holding mechanism 15 is a vacuum suction type and releases the holding of the ball 37 while the ball holding mechanism 15 is moved by the robot arm 17. In this case, it is necessary to synchronize the operation of the robot arm 17 and the operation of the ball holding mechanism 15 with high precision. However, when a distance from the valve (not shown) which switches on and off state of the vacuum to the ball holding mechanism 15 provided at the tip of the robot arm 17 is long, a time lag is likely to occur after the valve is operated until the vacuum suction of the ball 37 is released. For this reason, it is necessary to separately provide a control or mechanism for matching the holding release timing.

Therefore, in the third ball insertion sequence, positions at which the balls 37 are to be finally arranged in the gap space CS between the outer ring 27 and the inner ring 29 are obtained in advance by a calculation or a test, and the respective balls 37 are directly arranged at the obtained target arrangement positions by the robot arm 17.

That is, a control program for arranging the balls 37 at the obtained target arrangement positions is prepared for each bearing number of the ball bearing and is stored in the storage unit 49 shown in FIG. 4. The server 50 outputs the information of the program number, which corresponds to the bearing number of the ball bearing which is an insertion target, of the control programs of the algorithms to the control unit 21. The control unit 21 selectively executes the designated control program, based on the program number information input from the server 50.

Figure 11:
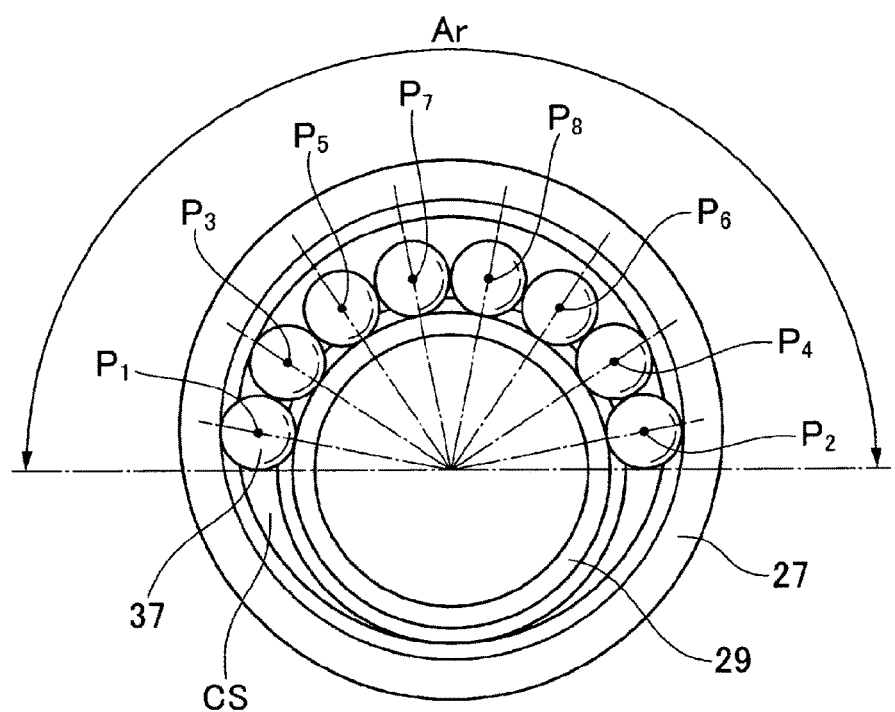
FIG. 11 shows a third ball insertion sequence of the ball bearing device.

FIG. 11 shows the third ball insertion sequence of the ball bearing device.

The control program which is to be used for the third ball insertion process is prepared to insert the ball in a following sequence. First, an actual gap area Ar having a radial width, in which the ball 37 can be arranged, of the gap space CS between the outer ring 27 and the inner ring 29 is obtained and division areas are then obtained by dividing the actual gap area Ar along the circumferential direction as many as the number of balls. In the obtained division areas, ball center positions P1 to P8 are respectively obtained and are stored as the target arrangement positions.

Then, the balls 37 are arranged at the respective ball center positions P1 to P8, based on target arrangement coordinates, which are information of the obtained ball center positions P1 to P8.

In the shown example, the actual gap area Ar has a circumferential angle of 180° and the number of balls is eight. In the meantime, the circumferential angle, the number of balls and the like are determined in accordance with the bearing number, and are uniquely determined by the outer diameter of the inner ring, the inner diameter of the outer ring and the diameter of the ball.

Figure 12A:
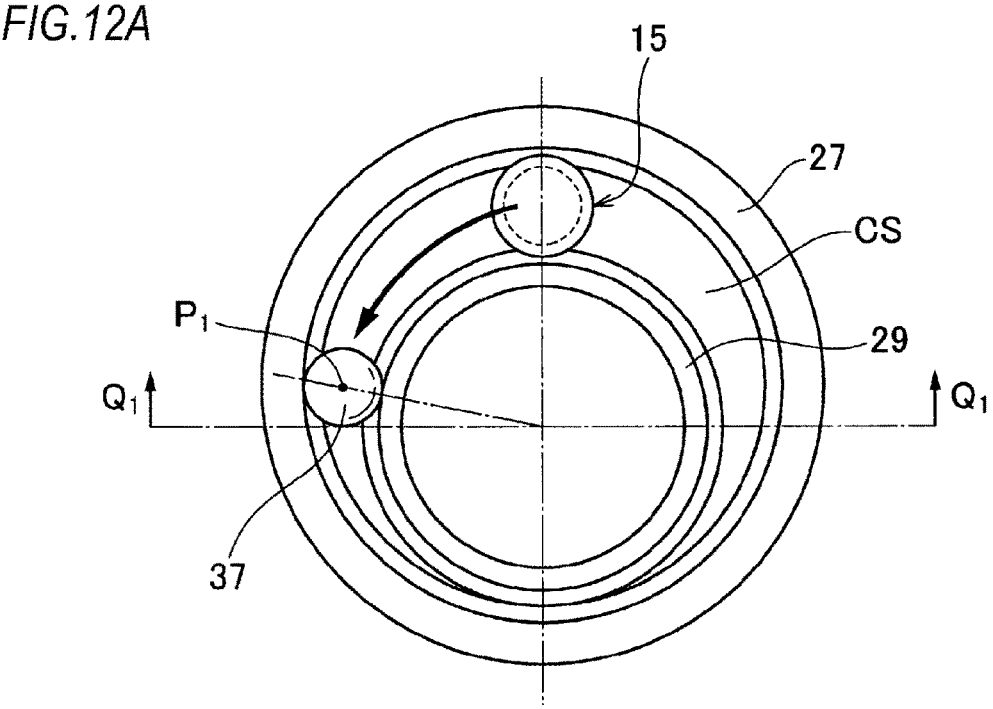
FIGS. 12A and 12B show the third ball insertion sequence of the ball bearing device.
Figure 12B:
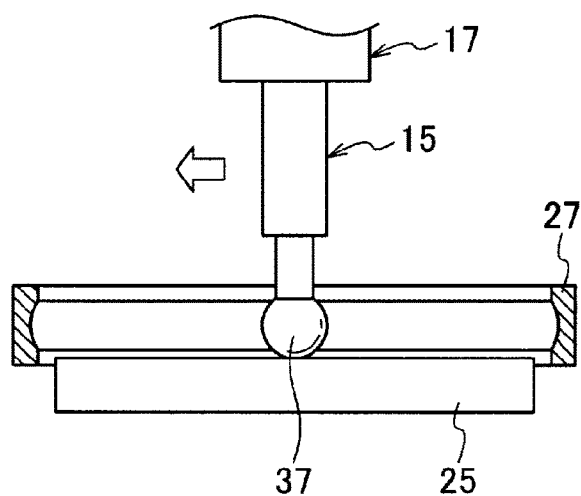
Figure 13A:
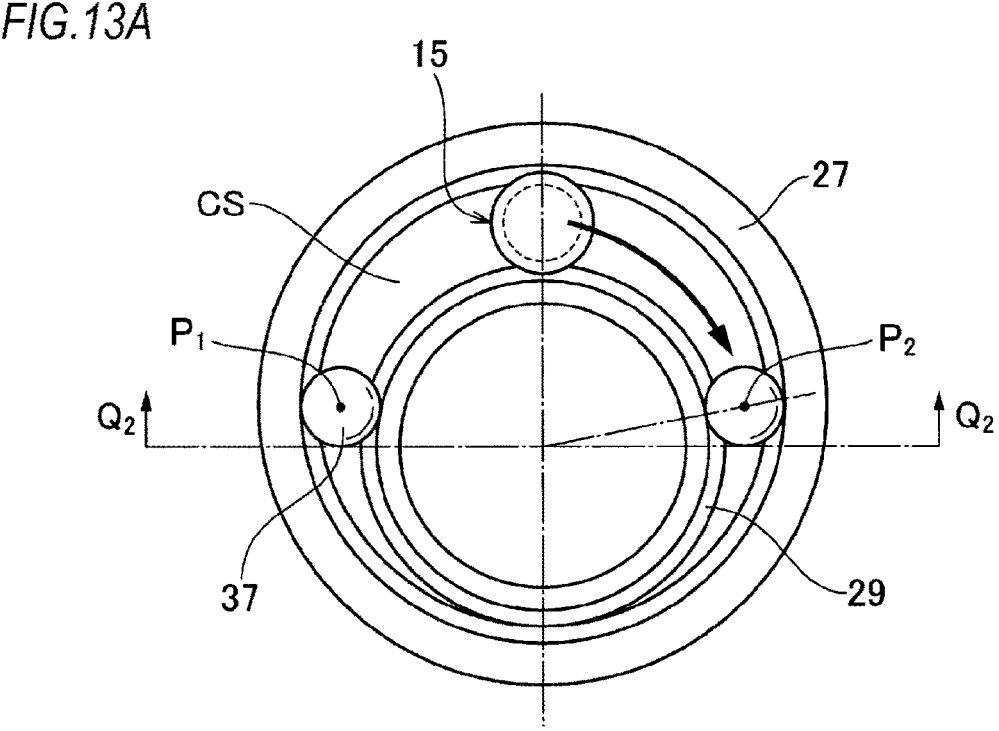
FIGS. 13A and 13B show the third ball insertion sequence of the ball bearing device.
Figure 13B:
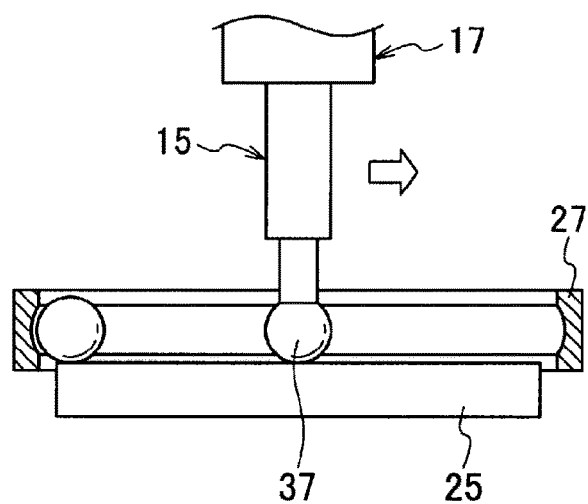

FIGS. 12A to 13B show the third ball insertion sequence of the ball bearing device. FIG. 12A is a plan view of the outer ring 27 and the inner ring 29 placed on the inner and outer ring holding unit, and FIG. 12B is a schematic sectional view taken along a line Q1-Q1 of FIG. 12A, in which the inner ring 29 is omitted. Also, FIG. 13A is a plan view of the outer ring 27 and the inner ring 29 placed on the inner and outer ring holding unit, and FIG. 13B is a schematic sectional view taken along a line Q2-Q2 of FIG. 13A, in which the inner ring 29 is omitted.

In the third ball insertion sequence, the control unit 21 (refer to FIG. 1) outputs the arm driving signal to the arm driving unit 19, and the arm driving unit 19 drives the robot arm 17 based on the input arm driving signal, thereby moving the arm tip to the position of the stocker 13. Then, the control unit 21 outputs the holding signal to the ball holding mechanism 15, and the ball holding mechanism 15 suctions and holds the ball 37 from the stocker 13. Then, the arm driving unit 19 transports the ball 37 to the ball insertion position in the vicinity of the center in the circumferential direction of the gap space CS between the outer ring 27 and the inner ring 29 by the robot arm 17, based on the arm driving signal, and inserts the ball 37 into the gap space CS with continuing to hold the ball, as shown in FIG. 12B.

Thereafter, as shown in FIG. 12A, the arm driving unit 19 drives the robot arm 17 to move the ball 37 held at the ball holding mechanism 15 to the ball center position P1. After the movement of the ball 37 is completed, the ball holding mechanism 15 releases the holding of the ball 37 by the holding release signal output from the control unit 21. Thereby, the released ball 37 is correctly positioned at the ball center position P1.

After the robot arm 17 arranges the ball 37 at the ball center position P1, the control unit 21 outputs the arm driving signal to the arm driving unit 19, and the arm driving unit 19 again moves the robot arm 17 to the position of the stocker 13. Then, the ball holding mechanism 15 suctions and holds a new ball 37 from the stocker 13 by the holding signal output from the control unit 21. Subsequently, the arm driving unit 19 again transports the ball 37 to the ball insertion position in the vicinity of the center in the circumferential direction of the gap space CS, based on the arm driving signal, and inserts the ball 37 into the gap space CS with continuing to hold the ball, as shown in FIG. 13B.

After that, as shown in FIG. 13A, the arm driving unit 19 drives the robot arm 17 to move the ball 37 suctioned and held at the ball holding mechanism 15 to the ball center position P2. After the movement of the ball 37 is completed, the ball holding mechanism 15 releases the holding of the ball 37 by the holding release signal output from the control unit 21. Thereby, the released ball 37 is correctly positioned at the ball center position P2.

Thereafter, the control unit 21 repeatedly executes the above sequences as many times as the number of remaining balls. Thereby, the balls 37 are arranged with being accurately positioned at all the ball center positions P1 to P8 obtained in advance.

According to the third ball insertion sequence, even when the operation timings of the ball holding mechanism 15 and the robot arm 17 deviate from each other, since the robot arm 17 is stationary at the timing at which the ball holding mechanism 15 releases the holding of the ball 37, it is possible to securely position the ball 37 at the predetermined ball center position.

<Fourth Ball Insertion Sequence>

Figure 14A:
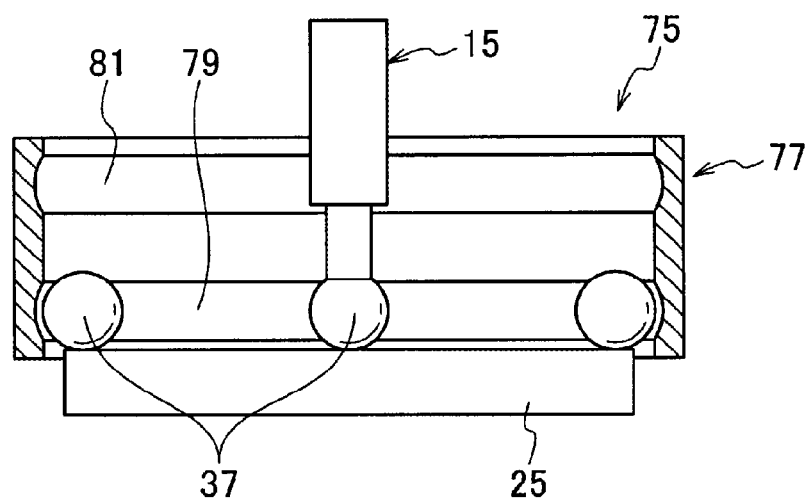
FIGS. 14A and 14B show a fourth ball insertion sequence of the ball bearing device.
Figure 14B:
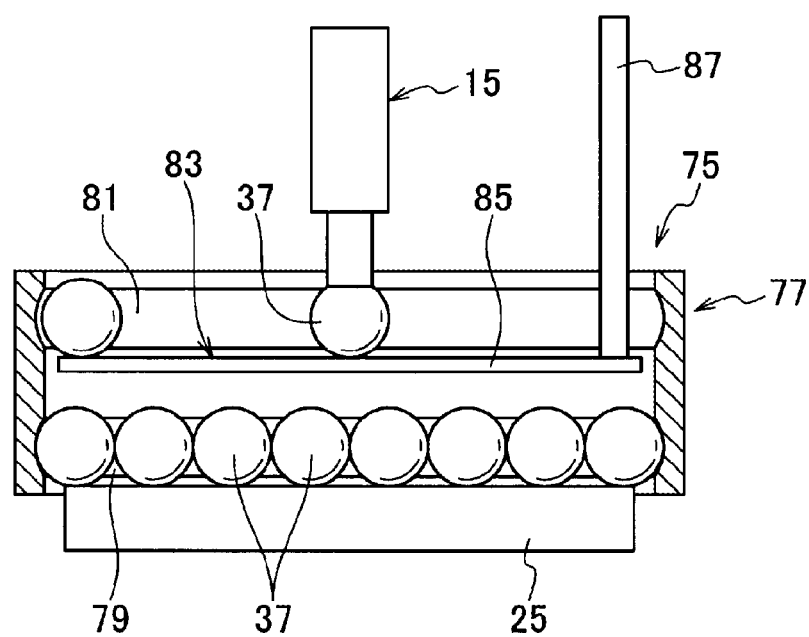

The first to third ball insertion sequences can be also applied when the ball bearing to be assembled is a double-row ball bearing. Here, a sequence of inserting the ball to a double-row ball bearing is described. FIGS. 14A and 14B show a fourth ball insertion sequence of the ball bearing device.

FIG. 14A is a sectional view showing an outer ring 77, in which an inner ring of a double-row ball bearing 75 arranged at the inner and outer ring holding unit is omitted. The double-row ball bearing 75 includes a first ball row 79 and a second ball row 81.

In the fourth ball insertion sequence, the control unit 21 (refer to FIG. 1) inserts the ball 37 to the first ball row 79, like the single-row ball bearing.

Figure 15:
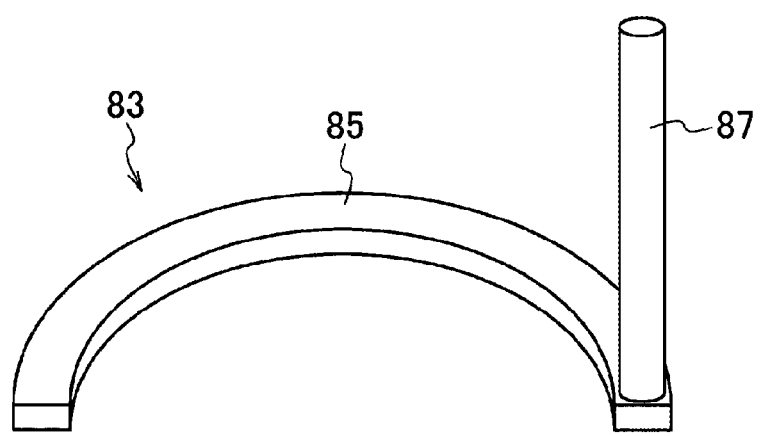
FIG. 15 is a perspective view of a curved arm jig.

Then, the control unit 21 inserts the ball 37 to the second ball row by using a curved arm jig 83 shown in FIG. 15. The curved arm jig 83 has a ball support part 85 having a partially circular ring shape, as seen from above, and a vertical arm 87 extending upwards from one end of the ball support part 85.

FIG. 14B shows a manner of loading the ball 37 to the second ball row 81. When loading the ball 37 to the second ball row 81, the control unit 21 adjusts a height position of the ball 37 in the second ball row 81 by using the curved arm jig 83, similarly to a case where a height position of the ball in the first ball row 79 is adjusted on the crescentic protrusion 25.

That is, the control unit 21 moves the vertical arm 87 by a driving mechanism (not shown), thereby arranging the ball support part 85 of the curved arm jig 83 so that a center of the ball to be arranged on the ball support part 85 is located at a height position (axial position) coinciding with the centers of the rolling surfaces of the inner and outer rings. Then, the control unit 21 inserts the ball 37 of the second ball row 81 onto the ball support part 85 of the curved arm jig 83, like the single-row ball bearing.

Figure 16:
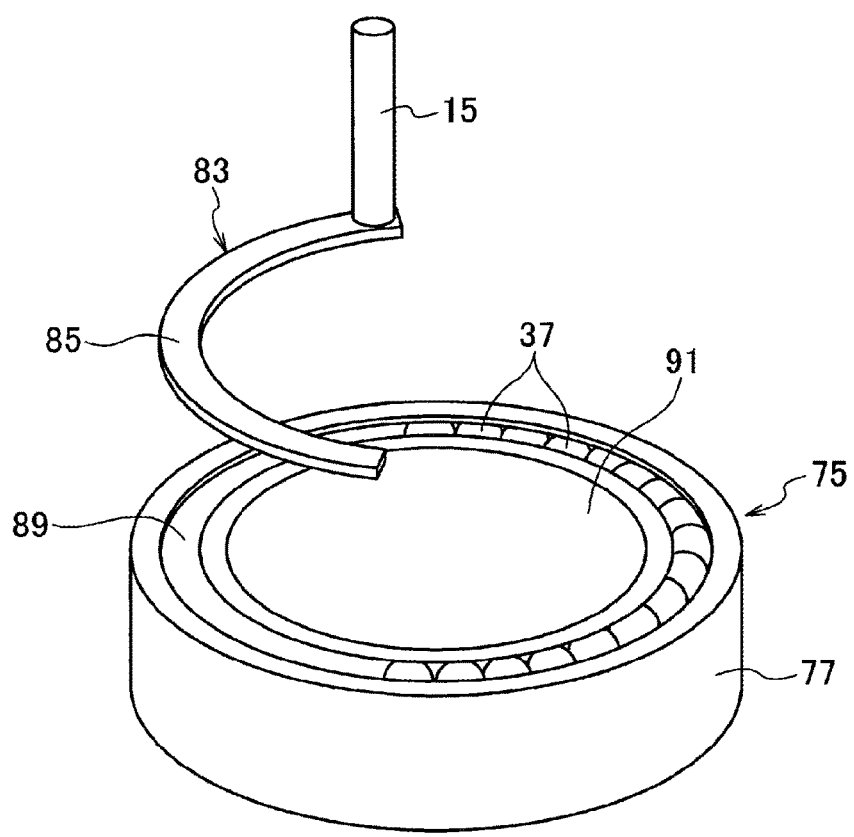
FIG. 16 shows a manner of removing the curved arm jig from the bearing.

When the insertion of the ball 37 to the second ball row 81 is completed, the control unit 21 performs a ball gathering operation of moving the inserted ball 37 of the second ball row 81 from the ball support part 85 along the raceway surfaces. By the ball gathering operation, the plurality of balls 37 are gathered on a PCD at an opposite side to the ball support part 85. Then, as shown in FIG. 16, the control unit 21 takes out (removes) the curved arm jig 83 upwards from a non-occupied part 89 of the balls 37 of the second ball row 81 by the driving mechanism (not shown).

The ball gathering operation may be performed not only by moving the ball 37 but also by rotating the inner ring 91 or moving the vertical arm 87 of the curved arm jig 83 along the PCD of the bearing.

According to the fourth ball insertion sequence, even when the bearing is a double-row bearing, it is possible to apply the first to third ball insertion sequences by using the curved arm jig 83.

As described above, according to the ball bearing assembly device and assembly method, since it is possible to perform a variety of the ball insertion sequences, in accordance with the control programs, it is possible to execute the ball insertion process at high speed with high positional precision and to simply perform the set changing in a short time. Also, the ball does not interfere with the end surfaces or groove shoulders of the inner and outer rings of the ball bearing, so that the ball is not damaged. Also, it is possible to correctly match the balls with the prescribed number of the balls.

Also, according to the ball insertion device 100 of the ball bearing, the plurality of control programs is stored in the ROM embedded in the storage unit 49 of the ball insertion device 100, and the control unit 21 selectively executes any one control program of the plurality of control programs, thereby executing each ball insertion sequence. However, the present invention is not limited thereto. For example, the plurality of control programs may be stored in a storage device separate from the ball insertion device 100, and the control unit 21 may perform communication with the storage device and to acquire the control program to be executed from the storage device. Also, the bearing number information of the server 50 may be stored in the storage unit 49 of the ball insertion device 100.

When the ball insertion is completed, the inner ring 29 is moved to a position at which it is concentric with the outer ring 27 and is kept in the bearing such that the balls 37 are not to fly out from a bearing ring.

The present invention is not limited to the embodiments, and combinations of the respective configurations of the embodiments and changes and modifications made by one skilled in the art based on the specification and the well-known technology are also included within the scope of the present invention to be protected. For example, the ball holding mechanism may be fixed and the inner and outer rings or the stocker may be moved by a robot. Also in this case, it is possible to implement the operations relatively equivalent to the configuration of the present invention.

The present invention is based on a Japanese Patent Application No. 2014-186279 filed on Sep. 12, 2014, the content of which is herein incorporated by reference.

DESCRIPTION OF REFERENCE NUMERALS

11: inner and outer ring holding unit
13: stocker
15: ball holding mechanism
17: robot arm
19: arm driving unit
21: control unit
23: base plate
27: outer ring
29: inner ring
37: ball
49: storage unit
50: server
75: double-row ball bearing
77: outer ring
79: first ball row
81: second ball row
83: curved arm jig
85: ball support part
87: vertical arm
89: non-occupied part
100: ball bearing assembly device
150: parallel link type robot

The invention claimed is:

1. A ball bearing assembly method for inserting a plurality of balls into a gap space between an outer ring raceway surface and an inner ring raceway surface which comprise a part of a ball bearing, the method comprising:
    a gap space forming step of providing the outer ring raceway surface and the inner ring raceway surface to be eccentric to each other on a same plane,
    a ball holding step of holding any ball of the plurality of balls by a ball holding mechanism arranged at a tip of a robot arm from a stocker in which the plurality of balls are aligned,
    a ball transporting step of transporting the ball while being held by the robot arm from the stocker to a maximum gap position where a radial gap of the gap space is maximized according to a size of a ball of the plurality of balls, based on a control program, and
    a ball insertion step of, after the held ball is inserted in the gap space at the maximum gap position from the stocker, releasing the holding of the ball held by the ball holding mechanism while moving the held ball by the robot arm in a circumferential direction along a raceway surface,
    wherein a set of the ball holding step, the ball transporting step, and the ball insertion step is repeatedly performed a number of times equal to a number of the plurality of balls.

2. The ball bearing assembly method according to claim 1,
    wherein in the ball insertion step, a moving direction of the robot arm in the circumferential direction is alternately reversed for each ball inserted.

3. The ball bearing assembly method according to claim 1,
    wherein a target arrangement position of each of the plurality of balls is set in the control program, and
    wherein in the ball insertion step, after the held ball is inserted at the maximum gap position, the held ball is moved by the robot arm to the target arrangement position of the ball, and the holding of the ball by the ball holding mechanism is released after completion of the movement.

4. The ball bearing assembly method according to claim 1,
    wherein the ball bearing is a double-row ball bearing including a first ball row and a second ball row, and
    wherein after a ball is inserted in the first ball row, a curved arm jig having a partial circular ring-shaped ball support part is inserted in an axial position between the first ball row and the second ball row of the double-row ball bearing, and after a ball of the second ball row is inserted on the inserted ball support part, the inserted ball of the second ball row is moved to a position deviating from the ball support part along a raceway surface, and thereafter, the curved arm jig is removed from a non-occupied area of balls of the second ball row.

5. A ball bearing assembly device configured to insert a plurality of balls into a gap space between an outer ring raceway surface and an inner ring raceway surface, the device comprising:
    an inner and outer ring holding unit which holds an outer ring and an inner ring in a state where the outer ring raceway surface and the inner ring raceway surface are eccentric to each other on a same plane so as to form the gap space;
    a stocker in which the plurality of balls are aligned;
    a ball holding mechanism which releasably holds a ball;
    a robot arm which includes an arm tip arranged with the ball holding mechanism and is capable of moving to a designated position; and
    a control unit configured to drive the robot arm and the ball holding mechanism based on a control program in which a ball insertion position in the gap space is set according to a size of a ball bearing,
    wherein the control unit is configured to control the ball holding mechanism and the robot arm to perform a ball holding step of holding any ball of the plurality of balls from the stocker by the ball holding mechanism, a ball transporting step of transporting the held ball by the robot arm from the stocker to a maximum gap position where a radial gap of the gap space is a maximum, and a ball insertion step of releasing the holding of the held ball by the ball holding mechanism from the stocker while moving the ball by the robot arm in a circumferential direction along a raceway surface after the held ball is inserted in the gap space at the maximum gap position, and repeat a set of the ball holding step, the ball transporting step, and the ball insertion step a number of times equal to a number of the plurality of balls.

6. The ball bearing assembly device according to claim 5, wherein the ball holding mechanism is capable of individually releasably holding a plurality of balls.

\* \* \* \* \*